(12) United States Patent
Tanaka et al.

(10) Patent No.: US 7,058,467 B2
(45) Date of Patent: Jun. 6, 2006

(54) PROCESS MONITORING DEVICE FOR SAMPLE PROCESSING APPARATUS AND CONTROL METHOD OF SAMPLE PROCESSING APPARATUS

(75) Inventors: Junichi Tanaka, Tsuchiura (JP); Hiroyuki Kitsunai, Chiyoda (JP); Hideyuki Yamamoto, Kudamatsu (JP); Shoji Ikuhara, Hikari (JP); Kazue Takahashi, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/987,121

(22) Filed: Nov. 15, 2004

(65) Prior Publication Data

US 2005/0090914 A1 Apr. 28, 2005

Related U.S. Application Data

(63) Continuation of application No. 09/945,691, filed on Sep. 5, 2001, now Pat. No. 6,879,867.

(30) Foreign Application Priority Data

Mar. 5, 2001 (JP) .............................. 2001-060995

(51) Int. Cl.
*G06F 19/00* (2006.01)
(52) U.S. Cl. ........................... 700/108; 700/110; 438/9
(58) Field of Classification Search ................ 700/108, 700/110, 121; 438/9, 14, 16, 17
See application file for complete search history.

(56) References Cited

U.S. PATENT DOCUMENTS

| 5,347,460 | A |  | 9/1994 | Gifford et al. |  |
|---|---|---|---|---|---|
| 5,658,423 | A |  | 8/1997 | Angell et al. |  |
| 5,801,965 | A |  | 9/1998 | Takagi et al. |  |
| 5,910,011 | A |  | 6/1999 | Cruse |  |
| 6,021,215 | A | * | 2/2000 | Kornblit et al. | 382/141 |
| 6,153,115 | A | * | 11/2000 | Le et al. | 216/60 |
| 6,226,086 | B1 | * | 5/2001 | Holbrook et al. | 356/630 |
| 6,272,233 | B1 | * | 8/2001 | Takeo | 382/128 |
| 6,275,740 | B1 | * | 8/2001 | Smith et al. | 700/108 |
| 6,438,440 | B1 | * | 8/2002 | Hayashi | 700/121 |
| 6,442,445 | B1 | * | 8/2002 | Bunkofske et al. | 700/108 |
| 6,590,179 | B1 |  | 7/2003 | Tanaka et al. |  |
| 6,668,207 | B1 | * | 12/2003 | Montcalm et al. | 700/121 |
| 6,747,239 | B1 |  | 6/2004 | Tanaka et al. |  |
| 6,894,786 | B1 | * | 5/2005 | Holbrook et al. | 356/454 |

FOREIGN PATENT DOCUMENTS

| JP | 10-125660 | 5/1998 |
|---|---|---|
| JP | 11-087323 | 3/1999 |

* cited by examiner

*Primary Examiner*—Leo Picard
*Assistant Examiner*—Alexander Kosowski
(74) *Attorney, Agent, or Firm*—Antonelli, Terry, Stout and Kraus, LLP.

(57) ABSTRACT

A monitor data acquisition section acquires a plurality of monitor data relating to a processing state of one sample in a processing apparatus, via sensors. A data selection section selects monitor data belonging to an arbitrary processing division included in a plurality of processing divisions for the sample, from among the plurality of monitor data. A monitoring signal generation section generates monitoring signals based on the monitor data belonging to the arbitrary processing division selected by the data selection section. A display setting controller displays a plurality of monitoring signals obtained with respect to samples processed in the processing apparatus, on a display section in a time series manner.

2 Claims, 27 Drawing Sheets

PROCESS MONITORING DEVICE FOR SAMPLE PROCESSING APPARATUS AND CONTROL METHOD OF SAMPLE PROCESSING APPARATUS

CROSS-REFERENCE TO RELATED APPLICATIONS

This application is a continuation of application Ser. No. 09/945,691 filed on Sep. 5, 2001 now U.S. Pat. No. 6,879,867. The contents of application Ser. No. 09/945,691 are hereby incorporated herein by reference in their entirety.

BACKGROUND OF THE INVENTION

The present invention relates to a process monitoring device for sample processing apparatus and a control method of sample processing apparatus. In particular, the present invention relates to a process monitoring device for vacuum processing apparatus suitable for fine patterning of semiconductor devices and a control method of semiconductor device manufacturing apparatus utilizing the process monitoring device.

Year after year, critical dimensions of semiconductor devices are becoming finer and finer, and demands on dimension precision of patterning are becoming more and more strict. On the other hand, in a semiconductor manufacturing apparatus for patterning a semiconductor wafer physically or chemically by using heat and plasma, reaction products produced by a chemical reaction within the apparatus sticks to an internal wall of the apparatus and remains. Thus the reaction products often change the processing state of the wafer as processing goes on. Therefore, there is a problem that as the wafer processing is conducted on a large number of wafers the patterned shape of the semiconductor device gradually changes and the performance is degraded. In order to improve the situation, there are some countermeasures such as cleaning substances sticking to an internal wall of a chamber by using plasma and raising the temperature of the chamber wall to make substances hardly stick. In most cases, however, these countermeasures are not complete. Eventually, the patterned shape of the semiconductor devices gradually changes. Before the patterned shape changes so as to pose a problem, therefore, replacement or cleaning of parts of the manufacturing apparatus is conducted. Besides the deposited film, various variations of the apparatus state relate to variations of the wafer patterned shape. Therefore, there has been devised a contrivance such as detecting a change of the processing state within the semiconductor manufacturing apparatus, feeding back a result of detection to an input of a plasma processing apparatus, and keeping the processing state constant.

A method for monitoring such a variation of plasma processing is disclosed in, for example, JP-A-10-125660. In the disclosed example, there is shown a method of predicting the apparatus performance and diagnosing the plasma state by using model equations of relations between the plasma processing characteristic and electric signals of the apparatus. As its method, there is disclosed a method of deriving model equations representing relations between three electric signals and the plasma processing characteristic of the apparatus by using a multiple regression analysis. Another example is disclosed in JP-A-11-87323. In this disclosed example, there is shown a method of applying a typical detection system having a multiplicity of existing detectors attached thereto to a plasma processing apparatus and monitoring the apparatus state on the basis of the correlation signal of the detected signal. As a method for generating the correlation signal, model equations using ratios of six electric signals are disclosed. Another disclosure example is found in U.S. Pat. No. 5,658,423. In this disclosure example, there is shown a method of taking in light or a large number of a mass spectrometer, generating a correlation signal, and monitoring the apparatus state. As a method for generating this correlation signal, there is disclosed a method of using a principal component analysis.

SUMMARY OF THE INVENTION

In the method described in JP-A-10-125660, however, model equations representing relations between three electric signals and a processing characteristic are derived by using a multiple regression analysis on a map of a multi-dimensional space having a large number of processing conditions as axes. For thus measuring the processing characteristic on a vast map, an extremely large number of wafers are needed and its practical use is difficult. In addition, if a processing condition that has not been considered at the time of measurement changes, the derived model equations cannot be used. Furthermore, for introducing an influence of an internal condition that is difficult to observe and that poses a problem in practical use, such as a deposited film within the chamber, into the model equations, a further enormous number of processing characteristic acquisition experiments are needed. The method described in JP-A-11-87323 is a typical well-known method in which a correlation signal obtained from a multiplicity of detected signals supplied from a multiplicity of detection sections is used for diagnosis. However, the disclosed method for obtaining the correlation is also a conventional technique in which ratios of several signals are derived. It is thus difficult to find a concrete implementation section of a system that accurately monitors the state of a plasma processing apparatus, which assumes various states according to many variation causes.

Unlike this, U.S. Pat. No. 5,658,423 provides a method of monitoring various plasma states by conducting a principal ingredient analysis on a large quantity of data obtained by monitoring an apparatus and grasping a variation of the apparatus state. However, a further contrivance is needed for finding an effective implementation method in an actual plasma processing apparatus, which processes wafers having various device structures under various conditions, from this disclosed example. Especially in these known examples, there is not taken into consideration the fact that processing of even one wafer is typically conducted under a combination of some processing conditions and influences of respective processing steps on the working precision differ. Even if the processing conditions are constant, influences on the patterned shape differ according to whether the processing is conducted in the former half of the processing time or in the latter half of the processing time. The performance of the future semiconductor devices is sensitive even to an extremely minute change of the patterned shape. For monitoring such a minute change of the patterned shape and effecting control, a monitoring method of concrete processing with due regard to the time sequence of the processing is dispensable.

An object of the present invention is to provide a process monitoring device, a control method of a sample processing apparatus, and a sample manufacturing method that are capable of coping with various processing states of the sample processing apparatus and that can be easily operated.

Another object of the present invention is to provide a process monitoring device, a control method of a sample processing apparatus, and a sample manufacturing method that are capable of monitoring the processing states of the sample processing apparatus, monitoring the change of the processing state accurately and easily, and controlling the processing conditions.

In accordance with a first aspect of the present invention, a process monitoring device includes: a monitor data acquisition section for acquiring a multiplicity of monitor data relating to a processing state of one sample in a processing apparatus, via sensors; a data selection section for selecting monitor data belonging to an arbitrary processing division included in a multiplicity of processing divisions for the sample, from among the multiplicity of monitor data; a monitoring signal generation section for generating monitoring signals based on the monitor data belonging to the arbitrary processing division selected by the data selection section; and a display setting controller for displaying a multiplicity of the monitoring signals obtained with respect to samples processed in the processing apparatus, on a display section in a time series manner.

In accordance with another aspect of the present invention, a process monitoring device includes: a monitor data acquisition section for acquiring a multiplicity of monitor data relating to a processing state of one sample in a processing apparatus, via sensors; a data selection section for selecting monitor data belonging to an arbitrary processing division included in a multiplicity of processing divisions for the sample, from among the multiplicity of monitor data; a monitoring signal generation section for generating monitoring signals based on the monitor data belonging to the arbitrary processing division selected by the data selection section; a display setting controller for displaying a multiplicity of the monitoring signals obtained with respect to samples processed in the processing apparatus, on a display section in a time series manner; and a display switchover section for switching over the display according to a use situation of the processing apparatus.

In accordance with still another aspect of the present invention, a process monitoring device includes: a monitor data acquisition section for acquiring a multiplicity of monitor data relating to a processing state of one sample in a processing apparatus, via sensors; a monitoring signal generation section for extracting fewer monitoring signals than the number of monitored data, from among the multiplicity of monitor data by working the monitor data; and a display setting controller for displaying a multiplicity of the monitoring signals obtained with respect to samples processed in the processing apparatus, on a display section in a time series manner.

According to the present invention, there is provided a section for monitoring the processing state of a sample processing apparatus having a various complicated states due to processing conditions and the accumulated number of processed samples, and acquiring apparatus monitoring signals used to monitor the apparatus, from the various processing sequences. As a result, it is possible to provide a process monitoring device and its display method, a control method of a sample processing apparatus, and a semiconductor device manufacturing method that can be easily operated.

Furthermore, according to the present invention, monitor data are acquired from the plasma device by using sensors, and apparatus monitoring signals are generated from data of the most important sample processing division concerning the sample processing performance. As a result, it is possible to monitor the change of the processing state accurately and easily, and control the processing conditions.

DESCRIPTION OF THE EMBODIMENTS

Figure 1:
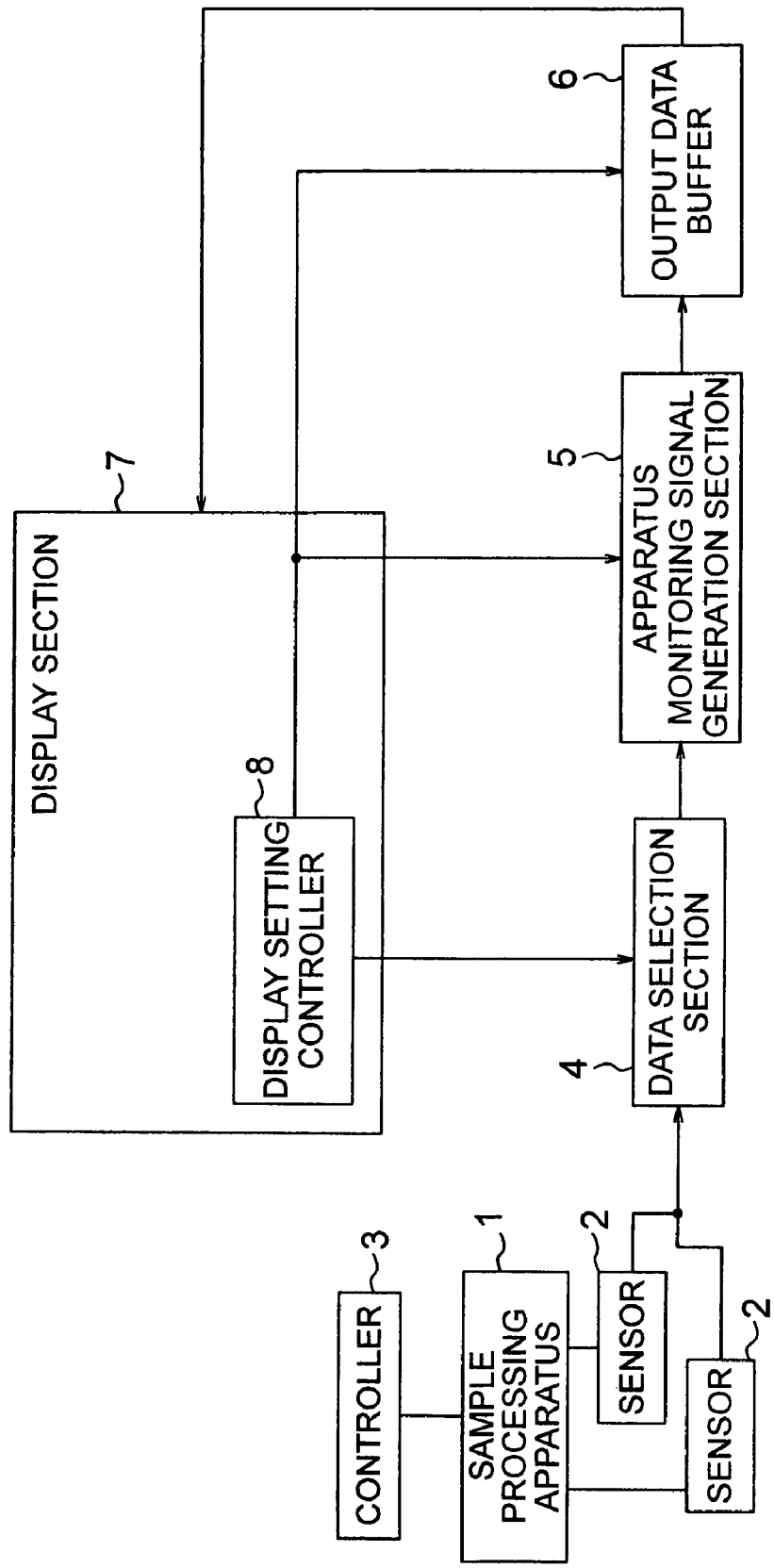
FIG. 1 is a diagram showing a general configuration of a sample processing apparatus according to a first embodiment of the present invention.

Hereafter, embodiments of the present invention will be described by referring to the drawing. In the ensuing description, components having the same function are denoted by like numerals, and duplicated description thereof will be omitted.

In FIG. 1, a first embodiment of the present invention is shown. FIG. 1 is a diagram showing a configuration of a sample processing apparatus having sensors and a display device according to a first embodiment of the present invention. Numeral 1 denotes a sample processing apparatus such as a semiconductor manufacturing apparatus or an LCD manufacturing apparatus. Herein, the sample processing apparatus 1 will be described as a semiconductor manufacturing apparatus that processes silicon wafers for manufacturing semiconductor devices as samples. The sample processing apparatus 1 includes a vacuum receptacle, a discharge section for forming a plasma generation section therein, and a processing section having electrodes for disposing a sample to be processed, such as a wafer, in the vacuum receptacle. Processing gas from a gas supply apparatus is supplied into the vacuum receptacle of the sample processing apparatus 1. The inside of the vacuum receptacle is evacuated by an evacuation apparatus so as to be decreased in pressure to a predetermined pressure. A high frequency power supply is connected to the electrodes.

In the sample processing apparatus 1 having the above described configuration, a wafer (sample) is carried in and placed on the electrodes. And processing gas is supplied to the inside of the vacuum receptacle by the gas supply apparatus. The processing gas becomes plasma by action of an electric field. The sample is subjected to processing, such as plasma etching, by the processing gas and plasma. The gas is evacuated later by the evacuation apparatus. Processing of the sample in the sample processing apparatus 1 is controlled by a controller 3.

In the sample processing apparatus 1, there are installed a multiplicity of sensors 2 for detecting and acquiring information concerning various processing states in the sample processing apparatus as monitor data. The sensors 2 monitor the processing states of the sample and the processing environment of the sample (hereafter simply abbreviated to the processing states of the sample) in the sample processing apparatus. At fixed or arbitrary time intervals, the sensors 2 acquire the monitor data. To be concrete, information concerning the processing gas supplied to the processing apparatus, and information concerning the pressure within the processing apparatus, the state of plasma generated within the processing apparatus, and processing working of the sample are included.

The sensors 2 may include a light detection section such as an optical spectrometer or a monochromator. The sensors 2 may include an electric signal detector such as a voltage detector, a current detector, or an impedance monitoring section. The sensors 2 may include a pressure detector of the inside of the apparatus. The sensors 2 may include a processing gas flow detector, or a position detector or a temperature detector of an operational portion of the apparatus, The sensors 2 may include a gas composition detector, such as a mass spectrometer, of the inside of the apparatus.

In order to grasp the complicated processing states within the processing apparatus, however, it is desirable to acquire as many and diverse monitor data as possible. In other words, spectra data obtained by dissolving light generated by plasma according to the wavelength, and spectra data obtained by dissolving an electric signal according to the frequency are optimum as monitor data.

Monitor data acquired by the sensors 2 are sent to a data selection section 4. For example, the sensor 2 acquires a spectrum of light generated in the processing apparatus once per second and sends it to the data selection section 4.

The data selection section 4 selects a portion to be used for apparatus monitoring from the sent monitor data. To be the simplest, the data selection section 4 may select all monitor data. The monitor data selected by the data selection section 4 are sent to an apparatus monitoring signal generation section 5. The apparatus monitoring signal generation section 5 generates apparatus monitoring signals according to monitoring types from the received monitor data, and sends them to an output data buffer 6. The monitoring type means a subject to be monitored with respect to the sample processing, such as the patterned shape of the sample, the state of a deposition film within the processing apparatus, the degrees of wear of components of the processing apparatus, a change of the processing state obtained from sample to sample by comparison among a multiplicity of samples, and a change of the processing state obtained from lot to lot by comparison among a multiplicity of lots.

The output data buffer 6 holds as many apparatus monitoring signals as required, and sends a multiplicity of apparatus monitoring signals to a display section 7. The display section 7 displays the sent apparatus monitoring signals on a display screen, and has a display setting controller 8. The display setting controller 8 has a function of setting a selection method in the data selection section 4, a monitoring type in the apparatus monitoring signal generation section 5, and the number of outputs in the output data buffer 6. The output data buffer 6 may be incorporated into the display section 7. The display setting controller 8 need not necessarily be attached to the display section 7, but may exist independently.

Figure 2:
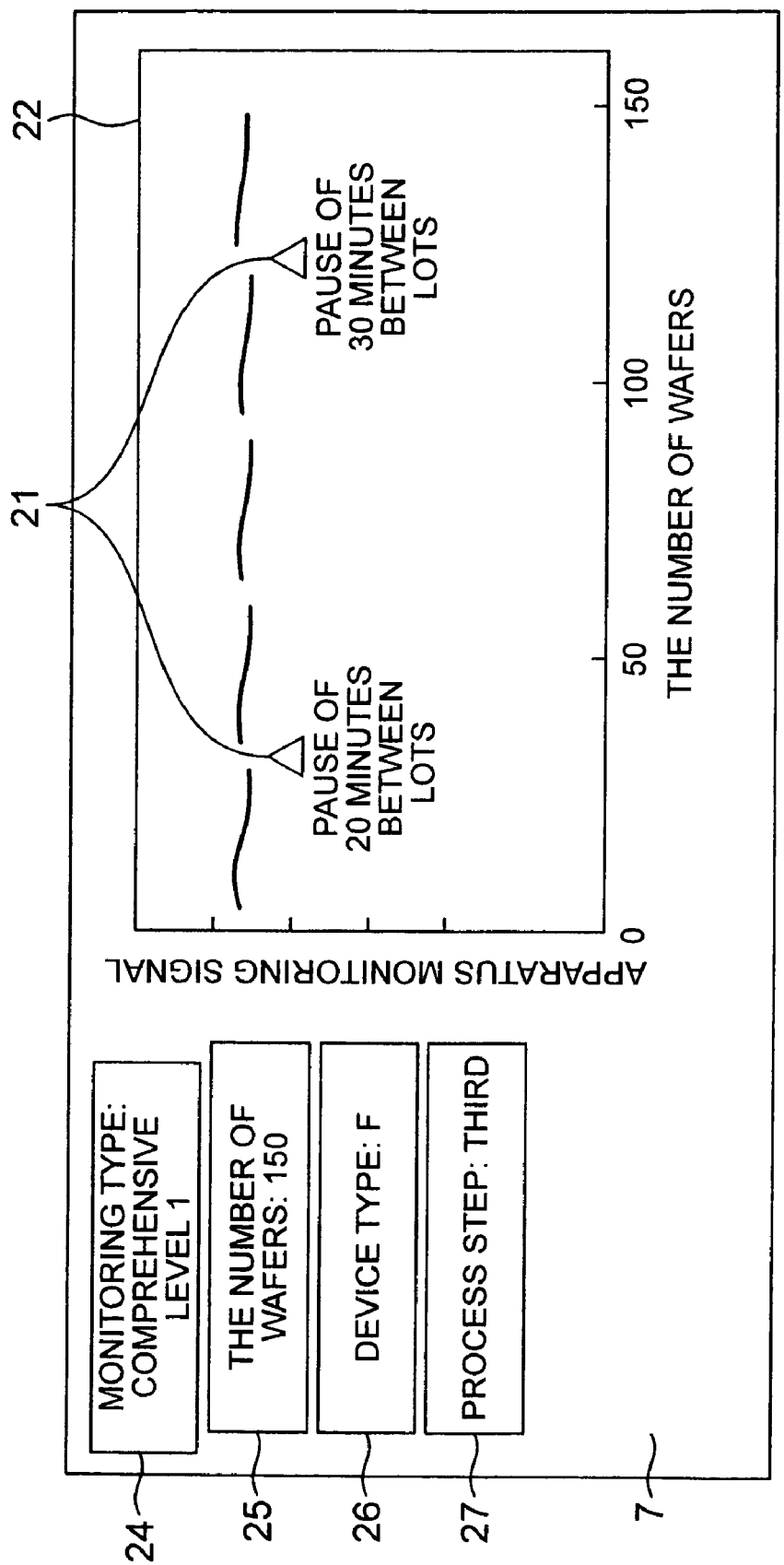
FIG. 2 is a diagram showing an example of a display screen of a display section in the sample processing apparatus of FIG. 1.

FIG. 2 shows an example of a display screen of the display section 7 in the sample processing apparatus 1 of FIG. 1. The display screen of the display section 7 has a function of serving as an input/output section for the display section 7 and the display setting controller 8. Display in a window 22 is controlled by the display setting controller 8.

In FIG. 2, the window 22 of the display section 7 displays the variation of the processing state from wafer to wafer. The window 22 displays a graph with, for example, the abscissa indicating wafers finished in processing and arranged in a time series and the ordinate indicating the apparatus monitoring signal plotted for each wafer. A description 21 of an event that has occurred in the apparatus may be added to the window 22. As for this event, an event that has occurred in the processing apparatus currently under processing, and an event that occurred in a semiconductor manufacturing apparatus that processed displayed wafers in the past may be acquired by a LAN or the like and displayed.

A button 24 displays a monitoring type of the apparatus monitoring signals currently displayed in the window 22. In addition, the button 24 may serve as a command button for opening a monitoring type setting window. In the same way, a button 25 displays the number of wafers displayed in the window 22. In addition, the button 25 is also a command button for opening a display sample number setting window. A button 26 displays a device type, i.e., a sample kind displayed in the window 22. In addition, the button 26 is also a command button for opening a device type setting window. A button 27 displays a sample processing division for generating the apparatus monitoring signals to be displayed in the window 22. In addition, the button 27 is also a command button that opens a window for selecting the sample processing division.

Figure 3:
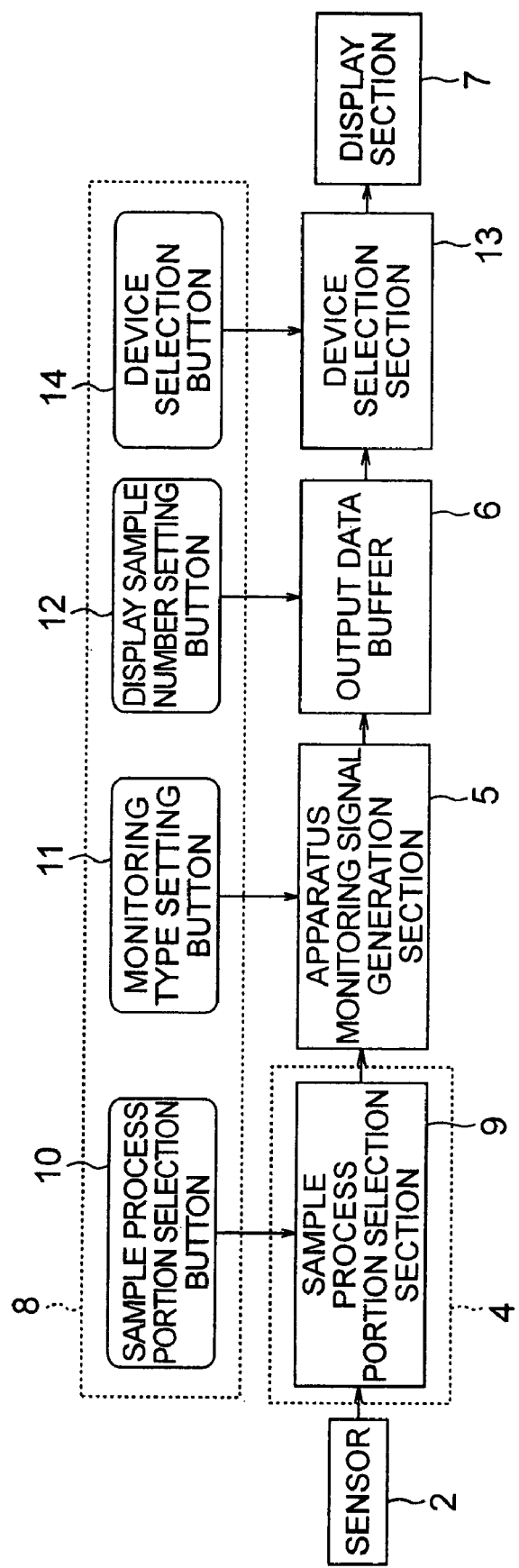
FIG. 3 is a diagram showing a configuration example of a processing system of a display setting controller for carrying out the display of FIG. 2.
Figure 4:
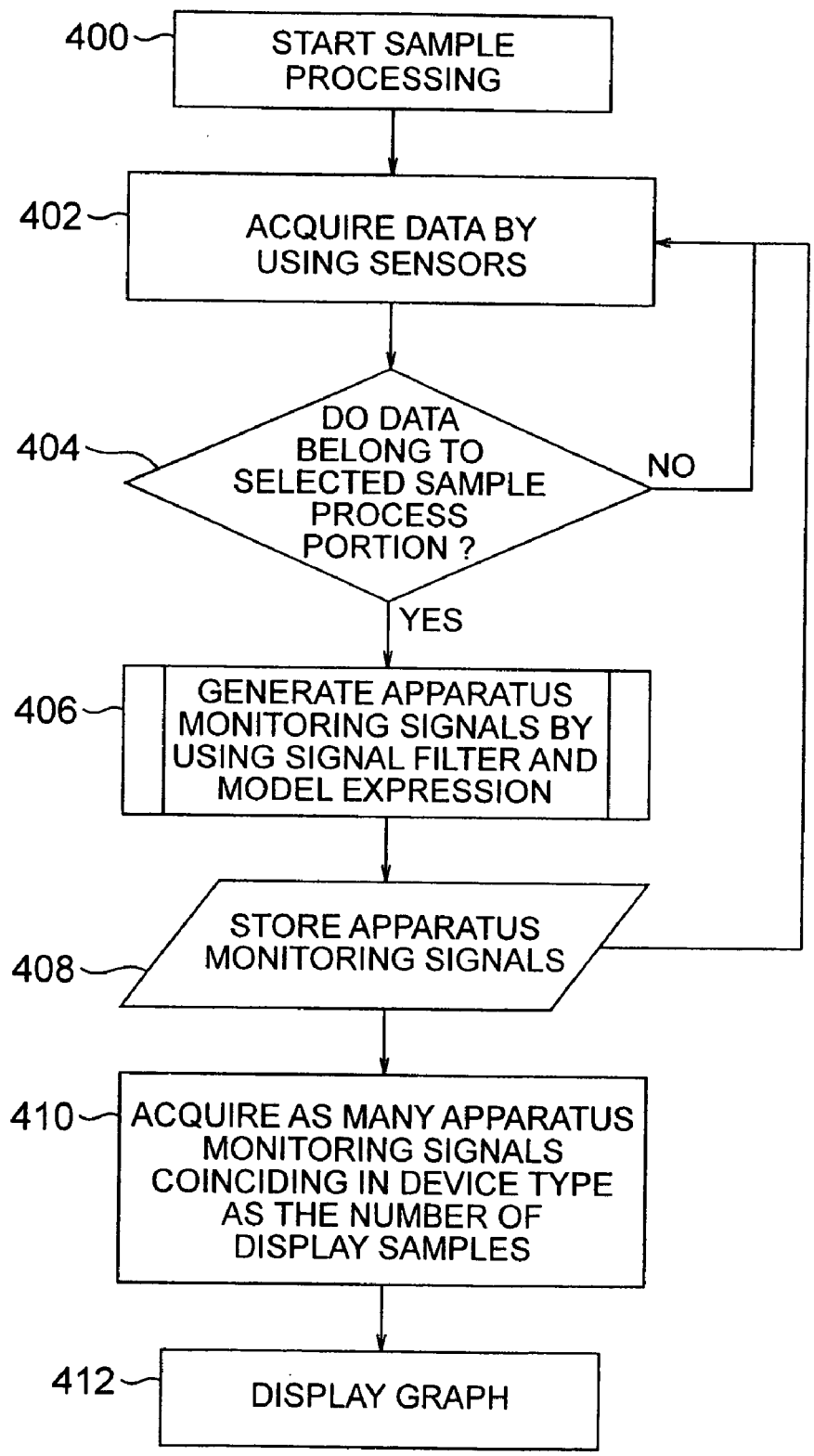
FIG. 4 is a diagram showing an embodiment of a flow of data processing of FIG. 3.

FIG. 3 shows a configuration example of a processing system of the display setting controller 8 for carrying out the display of FIG. 2. FIG. 4 shows an embodiment of a flow of the data processing.

In semiconductor manufacturing apparatuses, sampling processing is conducted under a combination of a multiplicity of processing conditions in many cases. Herein, a portion corresponding to each processing condition in the sample processing is referred to as sample processing division. The sample processing divisions are for example, a processing step of the sample, a sample unit, a lot unit, idle time of the sample processing time, and so on. The sample processing division may be divided further finely irrespective of partitions of the processing condition, or may be divided more roughly, for example, into the former half and latter half of the processing. For example, when the monitoring type is the sample patterned shape, the final sample patterned shape is not influenced evenly by all sample processing divisions, but there is a sample processing division to be monitored preponderantly. Therefore, monitor data acquired by the sensors 2 are sent to the data selection section 4 (S400 to S402 in FIG. 4).

In the case of this embodiment, the data selection section 4 includes only a sample processing division selection 9. By using a sample processing division selection button 10, a sample processing division of monitor data to be output can be selected. Selected monitor data is sent to the apparatus monitoring signal generation section 5 (S404). Apparatus monitoring signals of a kind selected by a monitoring type setting button 11 are generated by the apparatus monitoring signal generation section 5 (S406), and sent to the output data buffer 6 (S408). Typically, in the selected sample processing division, a large number of monitor data are acquired. As a result, a large number of data concerning the change of the apparatus monitoring signals with time are generated. In the case where the change of the processing state with time is to be monitored, the change of the processing state with time is sent to the output data buffer as it is. In the case where the change of the processing state from sample to sample is to be monitored, processing of averaging the apparatus monitoring signals for each sample and so on is conducted, and then a resultant signal is sent to the output data buffer 6. The output data buffer 6 sends apparatus monitoring signals corresponding to as many samples as the number specified by using a display sample number setting button 12 to a display device selection section 13 (S410). Only apparatus monitoring signals of samples of a kind specified by using a display device selection button 14 are sent to the display section 7, and displayed (S412).

Figure 5:
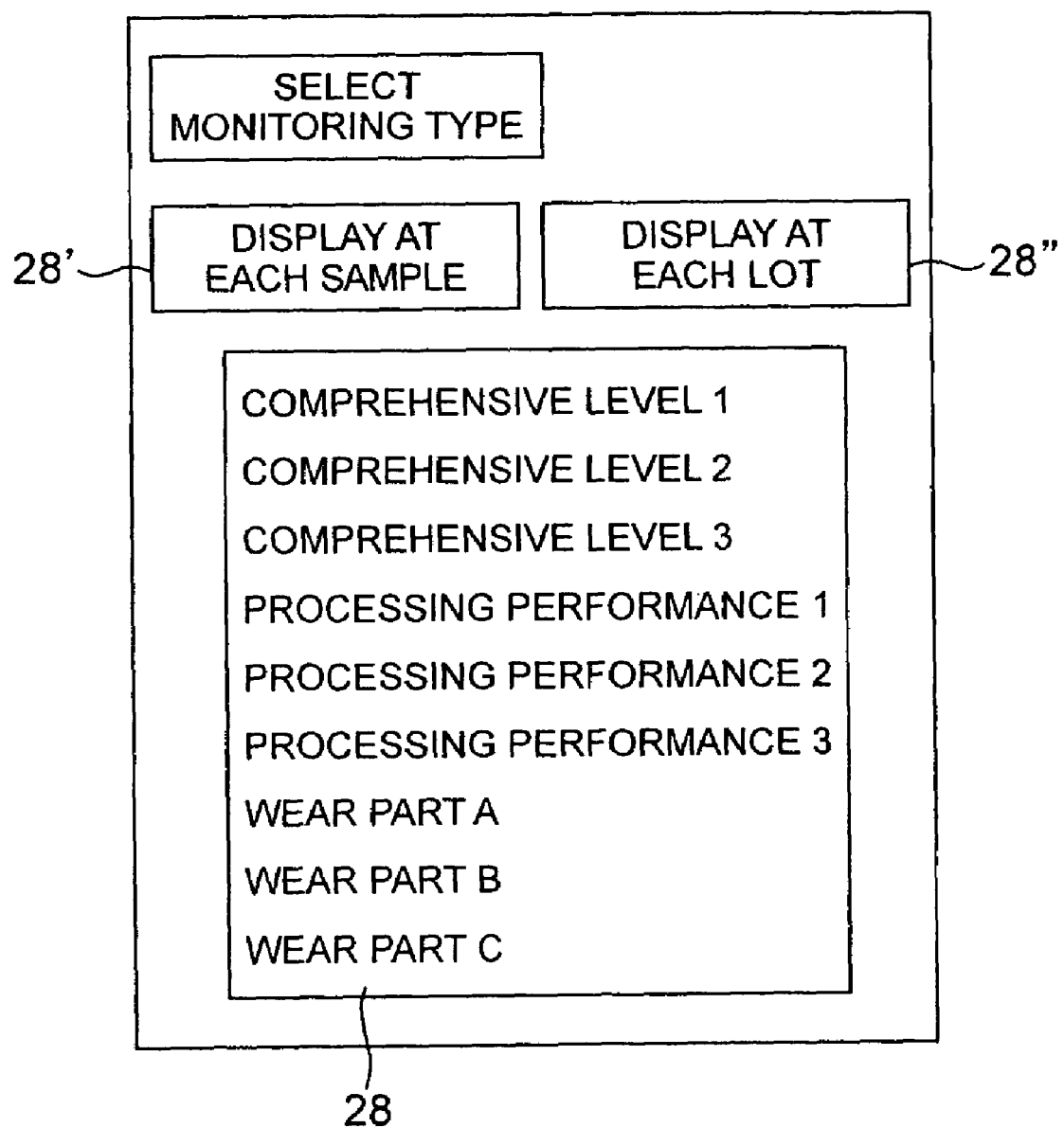
FIG. 5 is a diagram showing an example of a monitoring type selection window in a sample processing apparatus of FIG. 1.
Figure 6:
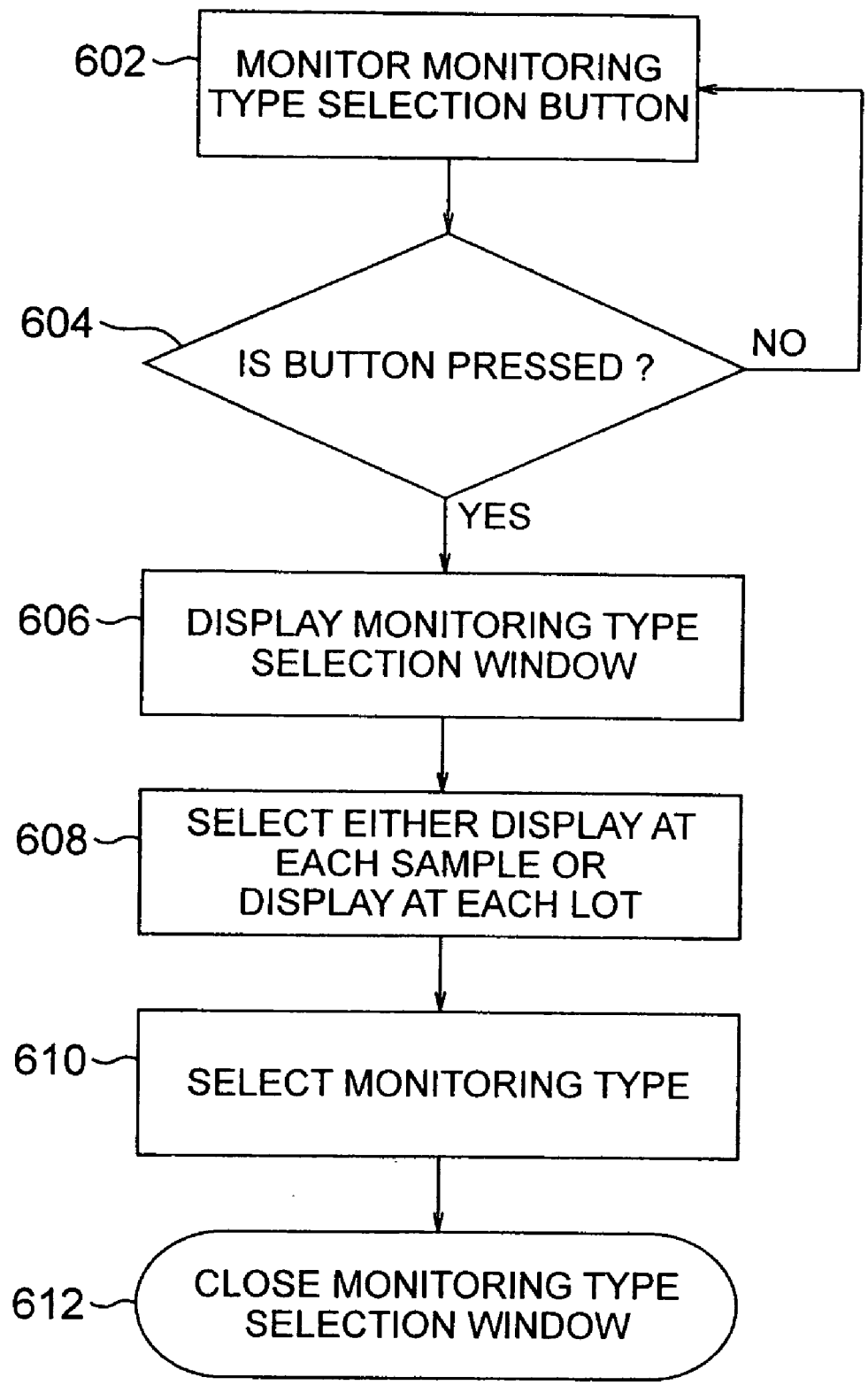
FIG. 6 is a diagram showing an example of an operation flow of a display setting controller in case of FIG. 5.

In FIGS. 5 and 6, another example of the window and the display setting controller 8 of the display section 7 is shown. FIG. 5 shows an example of a monitoring type selection window. FIG. 6 shows an example of an operation flow of the display setting controller 8.

If the button 24 is pressed, then the monitoring type selection window is displayed (S602 to S606). And a monitoring type can be selected by using a menu 28 (S608 to 5612). As for selection items of the menu 28, for example, "comprehensive level 1" is a monitoring type for displaying a rough processing state of the apparatus. "Comprehensive level 2" is a monitoring type of the processing state for monitoring a finer variation of the processing state. "Comprehensive level 3" is a monitoring type for monitoring a further finer variation. Besides, there may be an item of "processing performance" relating to the working dimension precision and patterned speed. There may be an item of "part wear" for indicating the degree of wear of parts in the apparatus. The check box 28 may be formed so that a multiplicity of kinds may be selected. In the case where a multiplicity of kinds have been selected, apparatus monitoring signals of a multiplicity of kinds are displayed in the window 22.

Figure 7:
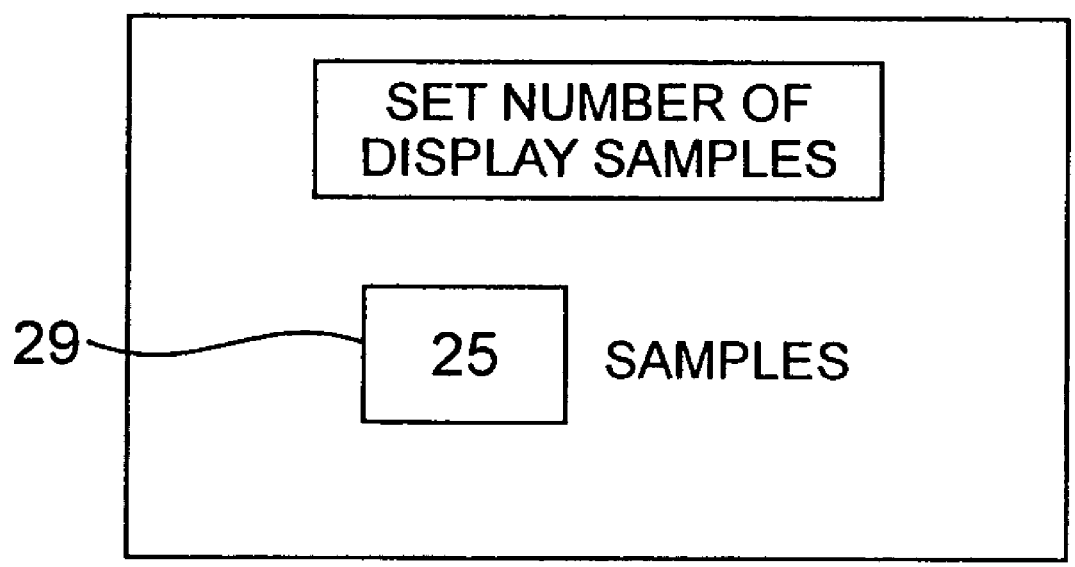
FIG. 7 is a diagram showing another example of a display sample number setting window in the sample processing apparatus of FIG. 1.
Figure 8:
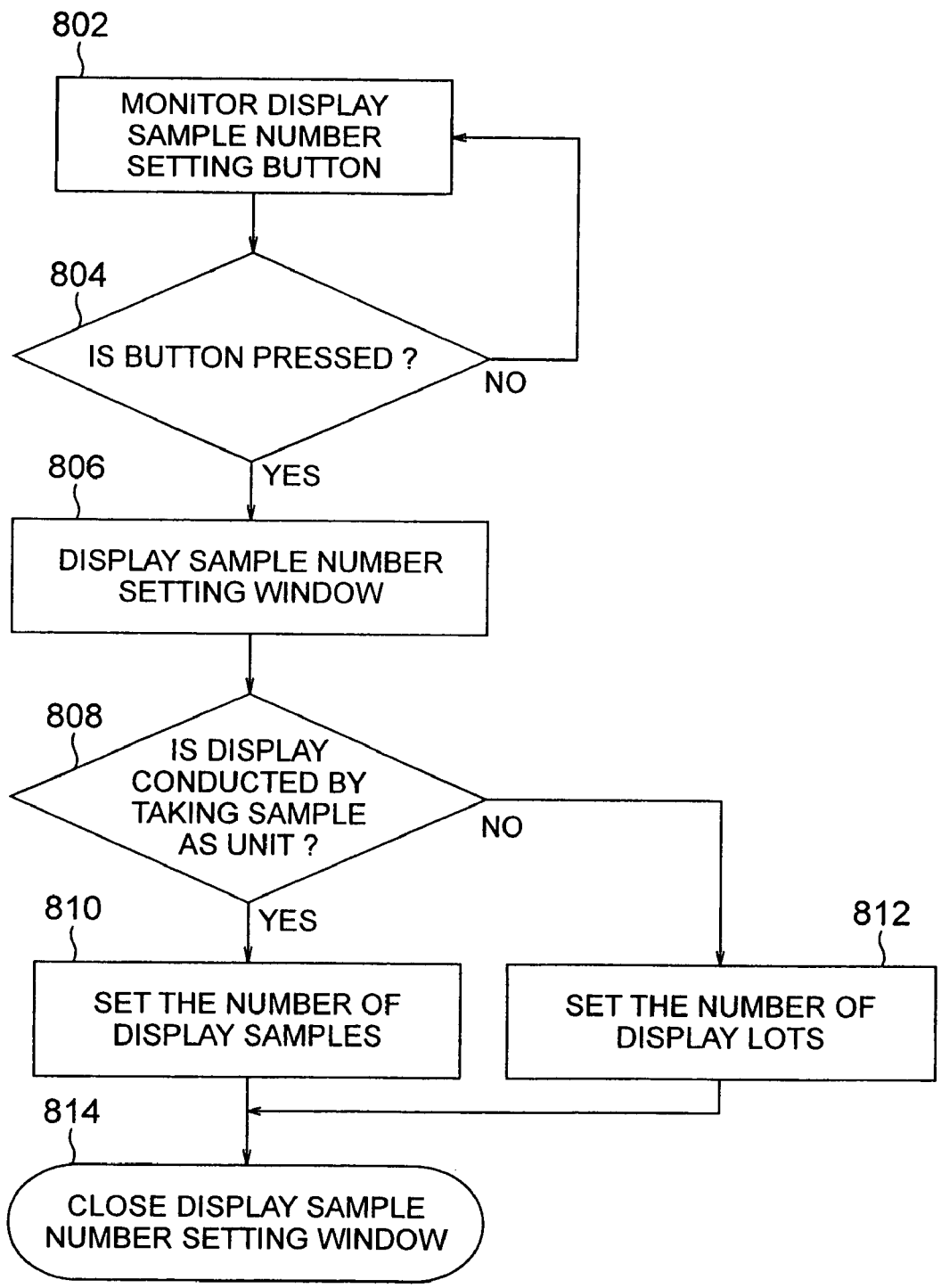
FIG. 8 is a diagram showing an example of an operation flow of a display setting controller in case of FIG. 7.

In FIGS. 7 and 8, another example of the window and the display setting controller 8 of the display section 7 is shown. FIG. 7 shows a display sample number setting window. FIG. 8 shows an example of an operation flow of the display setting controller 8.

The display sample number setting window is displayed by pressing the display sample number setting button 25 (S802 to S806). In the case of display conducted from sample to sample as in the window 22, the number of display samples is set by using an input section 29. In the case of display conducted from lot to lot as in a window 23 described later, the number of display lots is set by using the input section 29 (S808 to S814).

Figure 9:
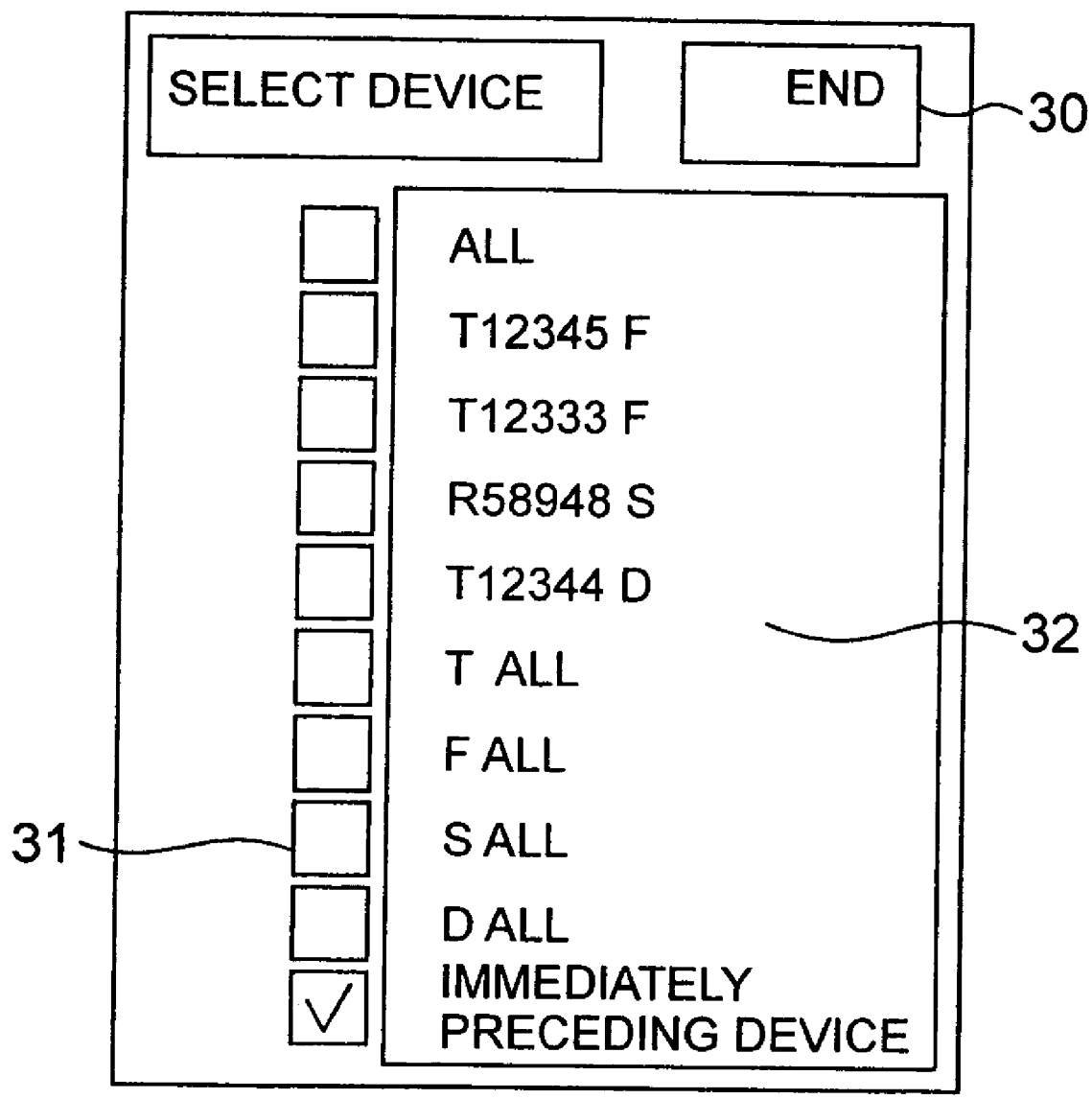
FIG. 9 is a diagram showing another example of a display sample number setting window in the sample processing apparatus of FIG. 1.
Figure 10:
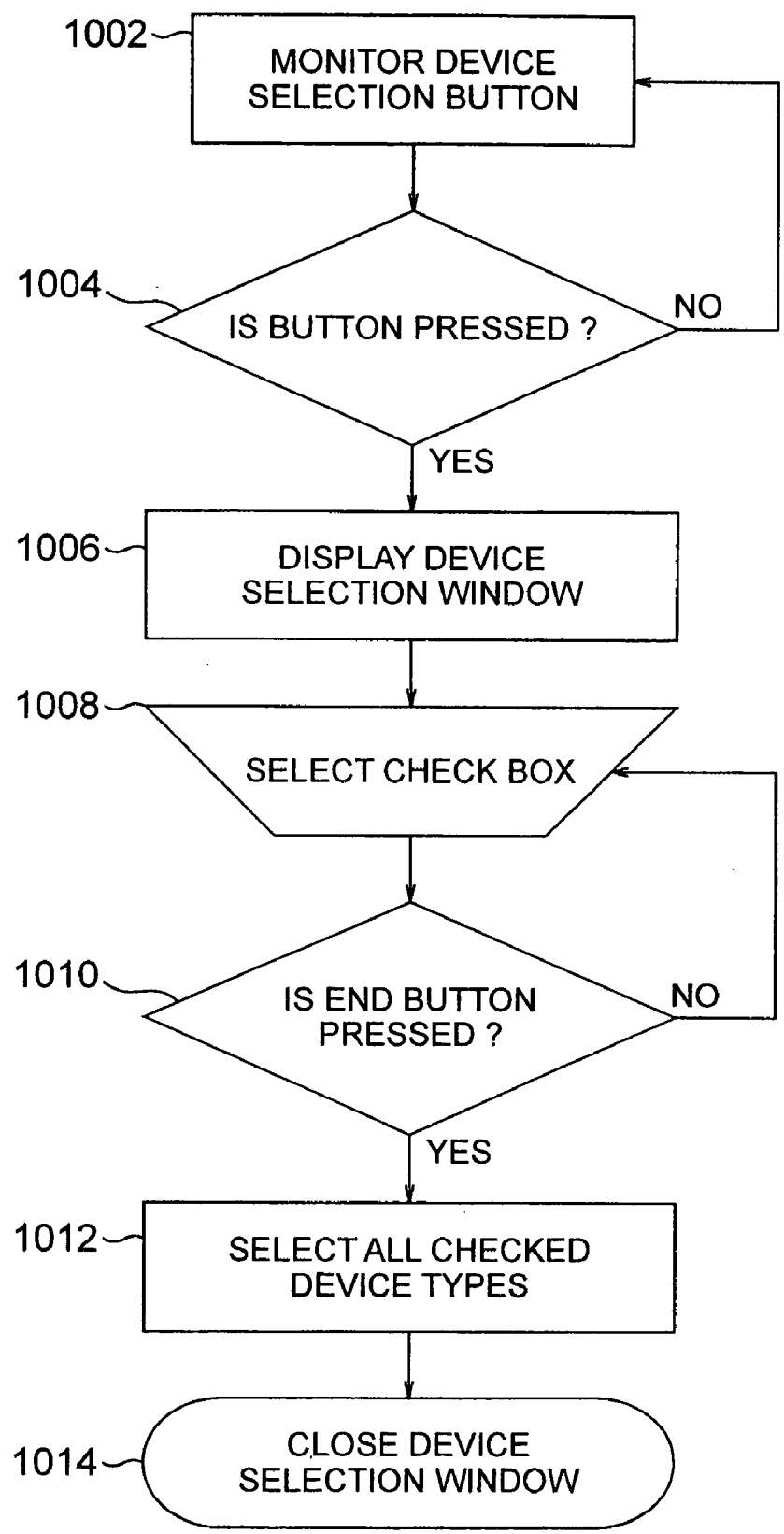
FIG. 10 is a diagram showing an example of an operation flow in a display setting controller of FIG. 9.

In FIGS. 9 and 10, another example of the window and the display setting controller 8 of the display section 7 is shown. FIG. 9 shows an example of a device type selection window. FIG. 10 shows an example of an operation flow of the display setting controller 8.

If the button 26 is pressed, then the device selection window is displayed (S1002 to S1006). A multiplicity of device kinds of samples can be selected by using check boxes 31 (S1008 to S1012). On device labels 32 corresponding to the check boxes 31, device kinds are listed. For example, it is now assumed that a device name is "T12345F" and "T" and "F" in the device name have meanings concerning the device structure. In this case, it is desirable to be able to select not only "T12345F" as the display device name but also all device names beginning with "T" or all device names ending with "F". On the device labels 32, it is also made possible to select all of the same devices as the sample finished in processing immediately before. When there are a multiplicity of kinds of recipes, i.e., combinations of processing conditions for the same device, it is also permissible to recognize them as respectively separate devices and allow device selection. Or a separate recipe selection window may also be prepared. If selection of device kinds to be displayed is finished and an end button 30 is pressed, then the selected device kind is decided and the device selection window is finished (S1014).

Figure 11:
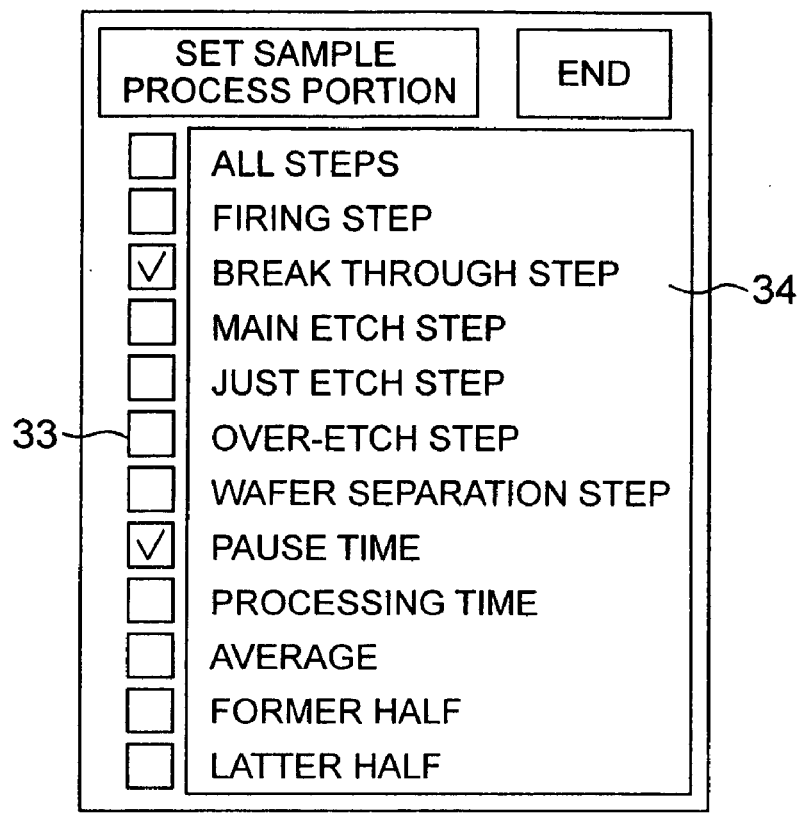
FIG. 11 is a diagram showing another example of a window and a display setting controller in a display section of the present invention.

In FIG. 11, another example of the window and the display setting controller 8 of the display section 7 is shown. FIG. 11 shows an example of a sample processing division selection window. By using check boxes 33, a multiplicity of sample processing divisions to be used for generating the apparatus monitoring signals can be selected. Operation of the display setting controller 8 is the same as that of FIG. 10. From a multiplicity of sample processing divisions, one apparatus monitoring signal may be generated and displayed. Or a multiplicity of apparatus monitoring signals may be generated and displayed. On sample processing division labels 34 corresponding to the check boxes 33, sample processing division names are displayed. Since the sample processing division name required to generate the apparatus monitoring signal differs depending upon the monitoring type, it is desirable that the sample processing division labels 34 differ according to the monitoring type selected by using the pull-down menu 28.

Figure 12:
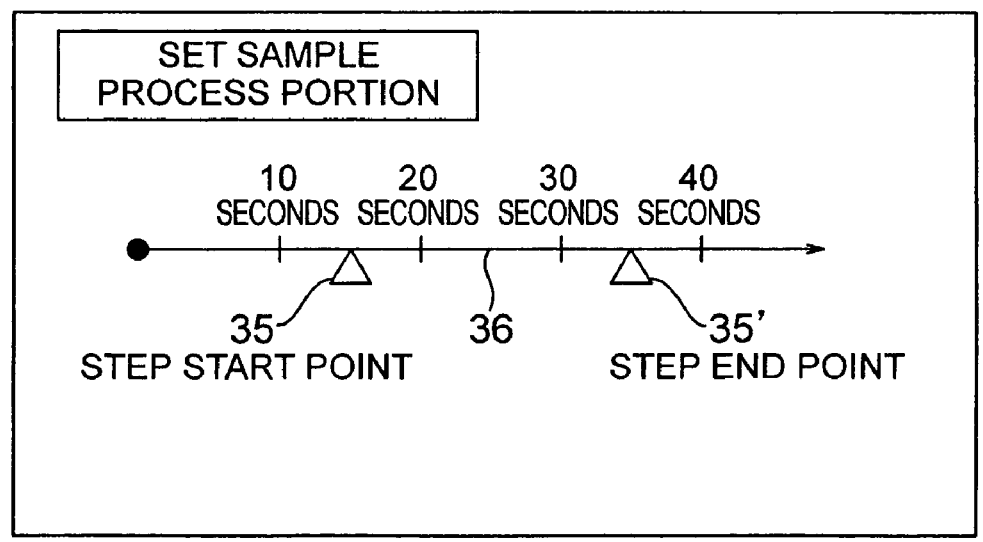
FIG. 12 is a diagram showing another example of a window and a display setting controller in a display section of the present invention.

In FIG. 12, another example of the window and the display setting controller 8 of the display section 7 is shown. In this example, not a pre-defined sample processing division, but an arbitrary processing division can be selected. By specifying a step start point 35 and a step end point 35' on a time axis 36, an arbitrary time range can be extracted as a sample processing division.

Figure 13:
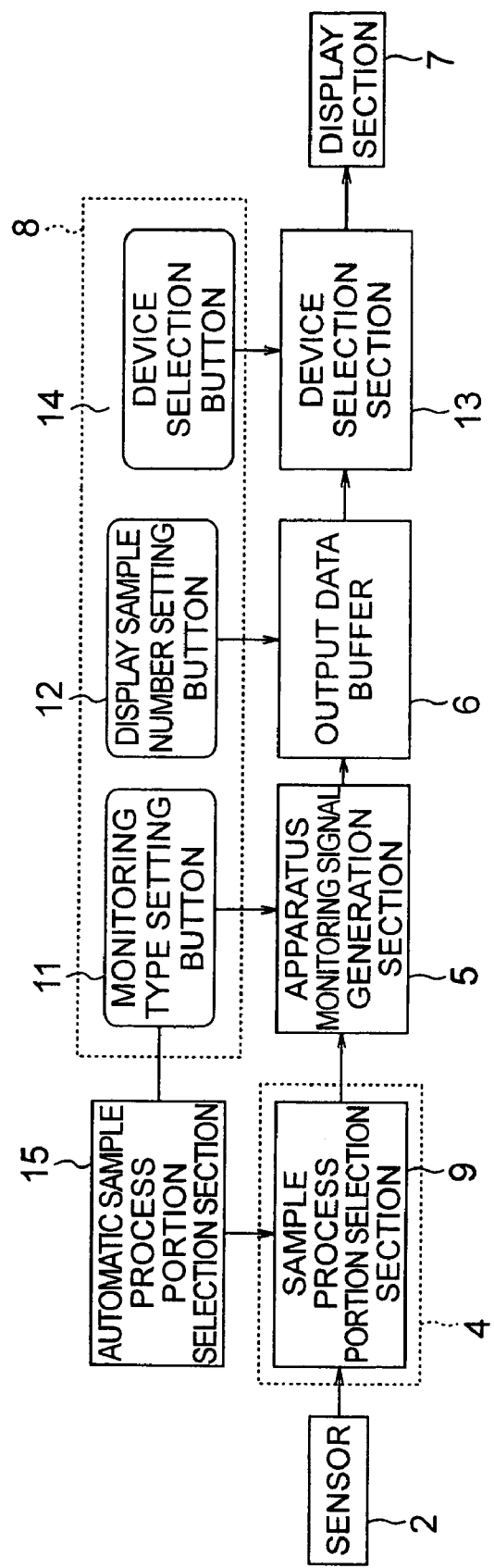
FIG. 13 is a diagram showing another example of a window and a display setting controller in a display section of the present invention.

In FIG. 13, another example of the window and the display setting controller 8 of the display section 7 according to the present invention is shown. A general operation sequence of this example is the same as that of FIG. 3 except in that an automatic sample processing division selection section 15 is added. In this example, the user does not conduct selection on displayed sample processing divisions. The automatic sample processing division selection section 15 judges a sample processing division that is optimum for a monitoring type set by the monitoring type setting button 11, and sets operation of the sample processing division selection 9. As for the processing steps selected here, some processing steps may be selected for one monitoring type.

Figure 14:
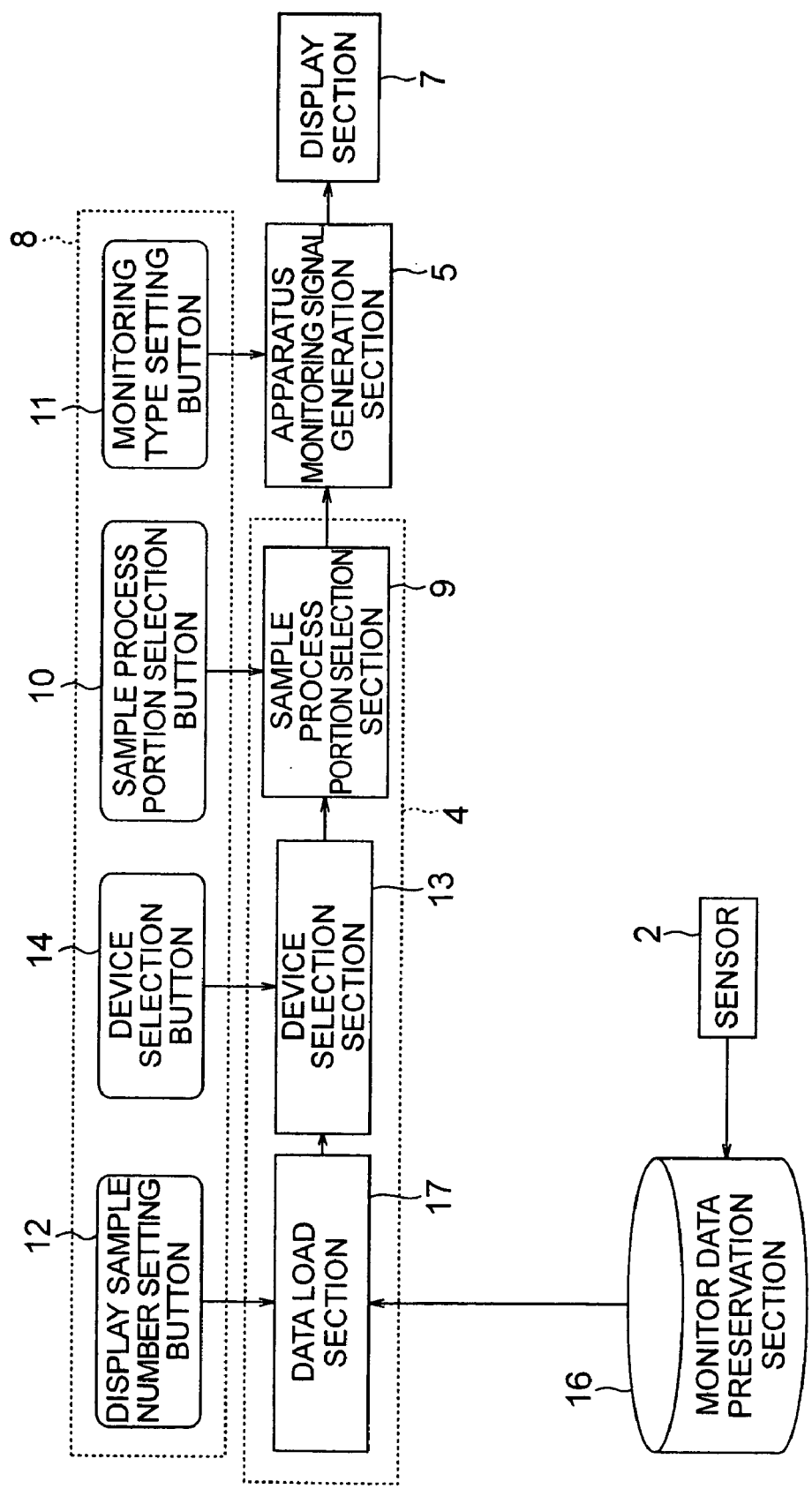
FIG. 14 is a diagram showing another example of a window and a display setting controller in a display section of the present invention.

In FIG. 14, another example of the window and the display setting controller 8 of the display section 7 according to the present invention is shown. In this embodiment, data acquired by the sensors 2 are stored in a monitor data preservation section 16. Subsequently, a data load section 17 takes out as many data as a number selected by using a display sample number setting button 12, from the monitor data preservation section 16, and sends the data to a device selection section 13. The device selection section 13 sends only monitor data of samples of kinds specified by using a device selection section 14 to a sample processing division selection section 9. Thereupon, only monitor data specified by using a sample processing division selection button 10 are sent to the apparatus monitoring signal generation section 5, and apparatus monitoring signals corresponding to the monitoring type setting button 11 are displayed on the display section 7.

Figure 15:
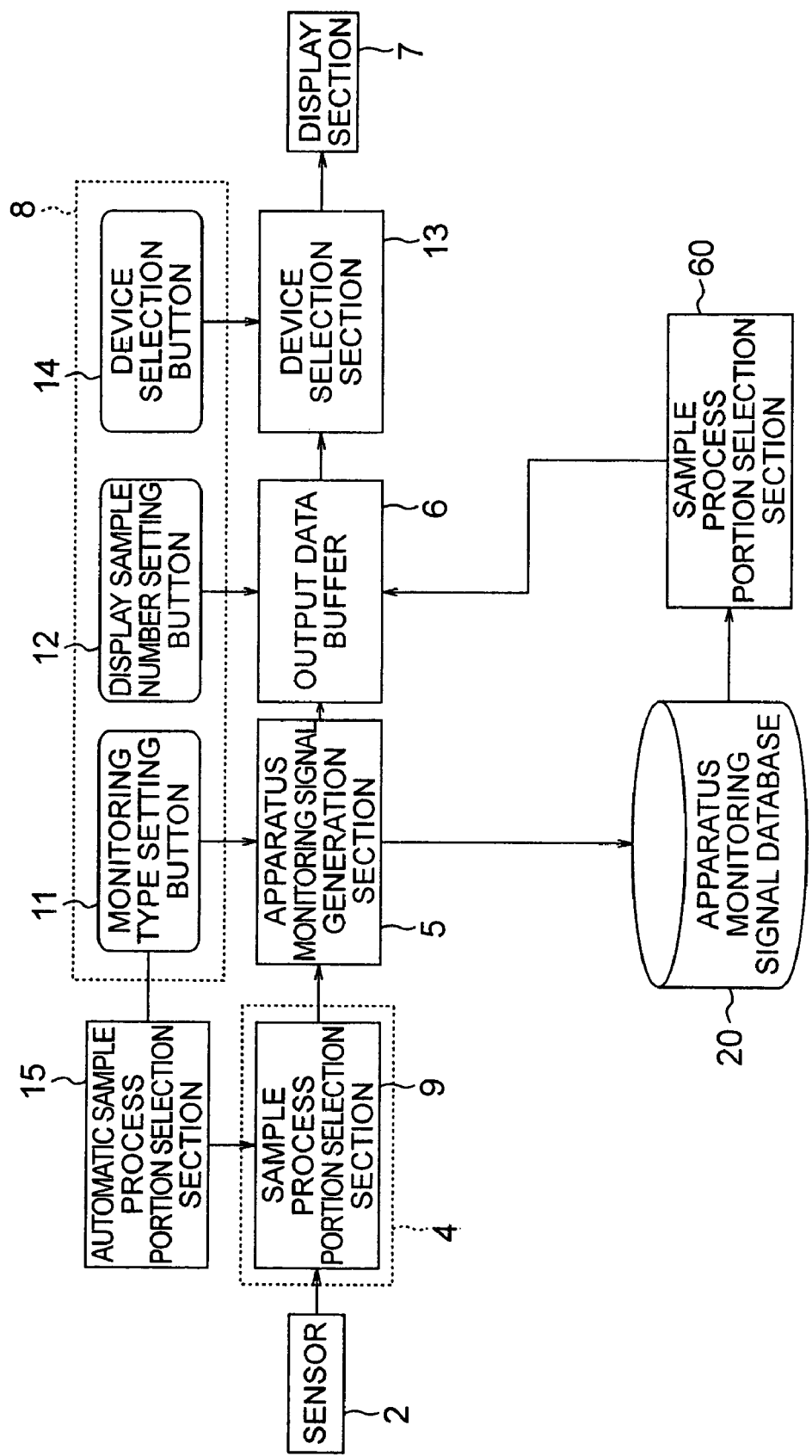
FIG. 15 is a diagram showing another example of a window and a display setting controller in a display section of the present invention.

In FIG. 15, another example of the window and the display setting controller 8 of the display section 7 according to the present invention is shown. In FIG. 14, monitor data of past processing are preserved. In the example of FIG. 15, only apparatus monitoring signals of past sample processing are preserved in an apparatus monitoring signal database 20. A sample processing division selection section 60 acquires apparatus monitoring signals of the past samples from the apparatus monitoring signal database 20, and supplies the signals to the output data buffer 6. In the case where there are a large quantity of data and the storage capacity becomes enormous, this method has an advantage that the preservation capacity can be reduced by storing only the apparatus monitoring signals compressed in information.

Figure 16:
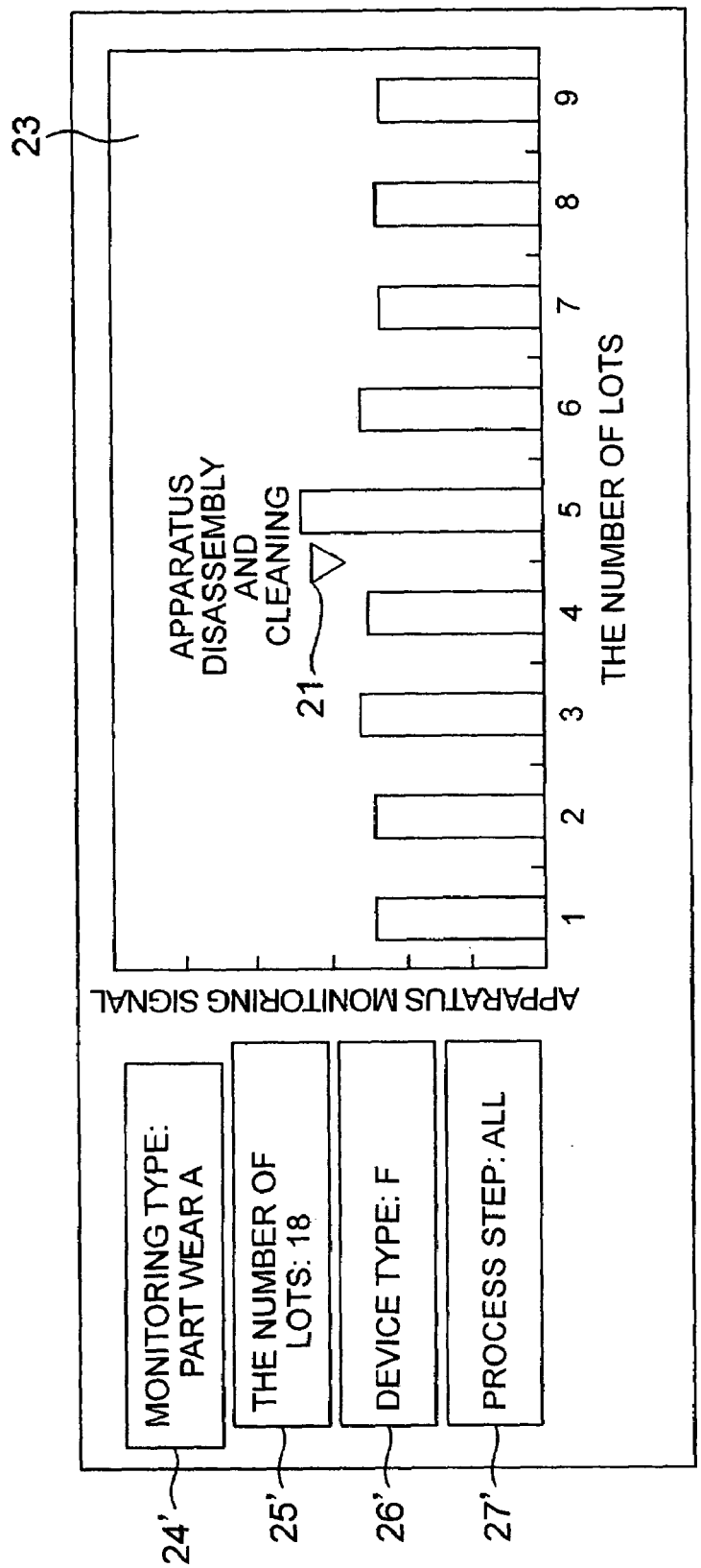
FIG. 16 is a diagram showing another example of a window and a display setting controller in a display section of the present invention.
Figure 17:
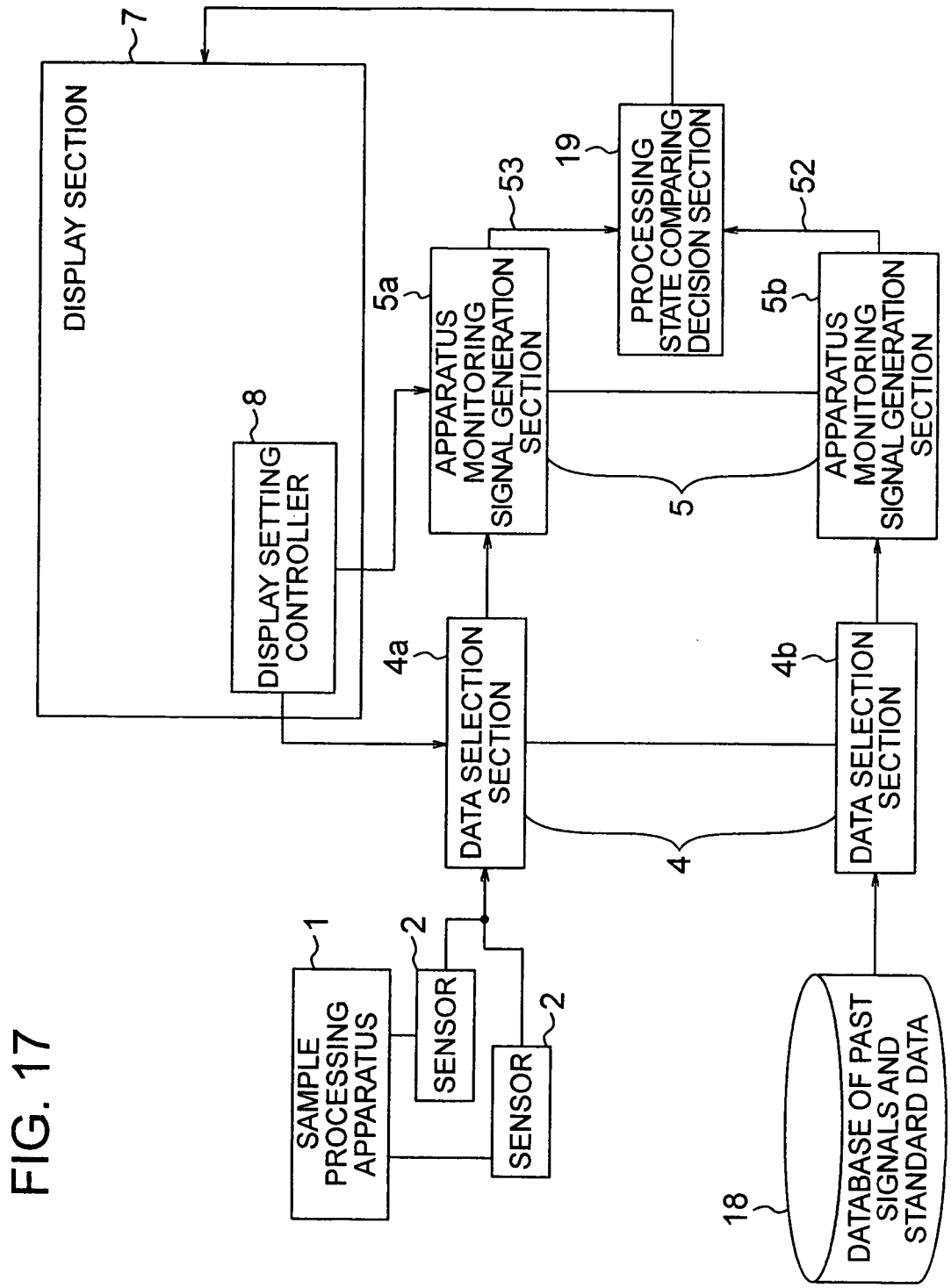
FIG. 17 is a diagram showing a configuration of a data processing system of a display setting controller for carrying out display of FIG. 16.

In FIGS. 16 and 17, another example of the window and the display setting controller 8 of the display section 7 according to the present invention is shown. A window 23 of this example displays a variation of the processing state from lot to lot. For selecting display conducted from wafer to wafer or display conducted from lot to lot, the selection can be conducted by using, for example, a sample after sample display selection button 28' or a lot after lot display selection button 28" in the monitoring type selection window. The window 23 displays a graph with, for example, the abscissa indicating lots finished in processing and arranged in a time series and the ordinate indicating the apparatus monitoring signal plotted for each lot. In manufacturing semiconductor devices, samples are processed by taking a cluster of several samples called lot as the unit.

In the case of 8-inch wafers, a cluster of twenty-five wafers is one lot in many cases. However, the number of samples included in one lot differs according to circumstances. Cleaning of the internal wall of the apparatus is conducted between samples in some cases. However, special cleaning processing is conducted between lots in some cases. Furthermore, in an idle time between lots, the temperature of each place in the processing chamber might change. Even in such a situation that samples are processed stably, therefore, the apparatus monitoring signal does not become a constant value. A certain variation pattern often repeats from lot to lot. This variation pattern differs according to the device kind of samples. In such a case, the conventional monitoring method of only determining whether a signal exists in a certain constant range is insufficient.

In the present invention, a variation pattern of a standard apparatus monitoring signal obtained during processing of a pertinent device and acquired from the database is compared with a variation pattern of a monitored apparatus monitoring signal. The comparison data is displayed as an apparatus monitoring signal plotted from lot to lot. A lot that has had an abnormality in processing can be easily found. Furthermore, it is more desirable that if a display portion of a lot is selected by a mouse or the like apparatus monitoring signals of respective materials in that lot are displayed. In this case, when a lot that is considered to be abnormal is found, selecting a display portion of this lot causes processing states of samples belonging to the abnormal lot to be displayed in the window 22. A sample included in the abnormal lot and subjected to abnormal processing can be easily found. Display in the window 23 can also be controlled by using buttons 24', 25', 26' and 27' having functions similar to those of the window 22.

FIG. 17 shows a configuration of a data processing system of the display setting controller 8 for carrying out the display of FIG. 16. Monitor data acquired by sensors 2 are subject to selection conducted by a data selection section 4 (4*a*). The selected monitor data is converted to an apparatus monitoring signal 53 by an apparatus monitoring signal generation section 5 (5*a*), and sent to a processing state comparing decision section 19. At the same time, standard data of the monitor data taken out from a database 18 is also selected by a data selection section 4 (4*b*). The selected standard data is converted to an apparatus monitoring signal 52 by an apparatus monitoring signal generation section 5 (5*b*), and sent to the processing state comparing decision section 19 as a standard apparatus monitoring signal.

Figure 18:
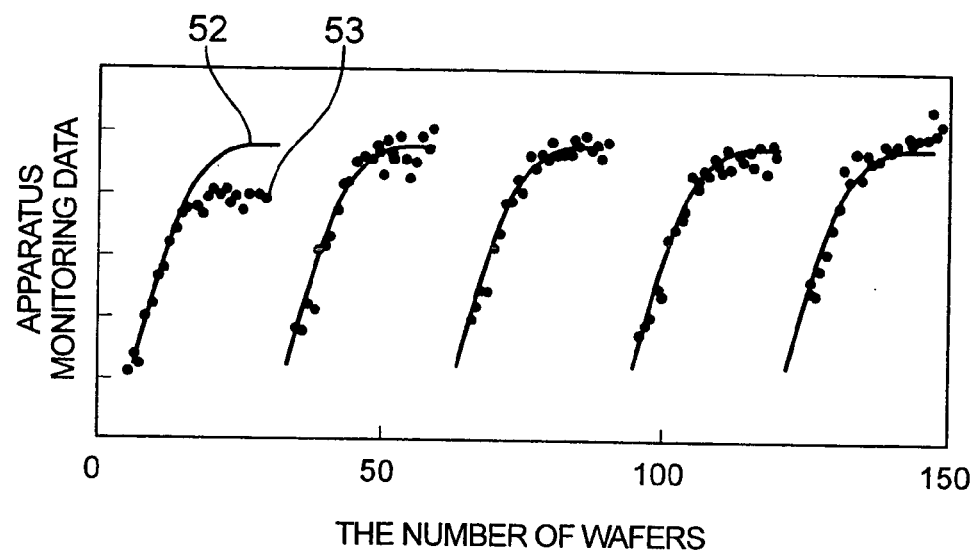
FIG. 18 is a diagram showing an example of a graph showing a comparison of two signals in FIG. 17.
Figure 19:
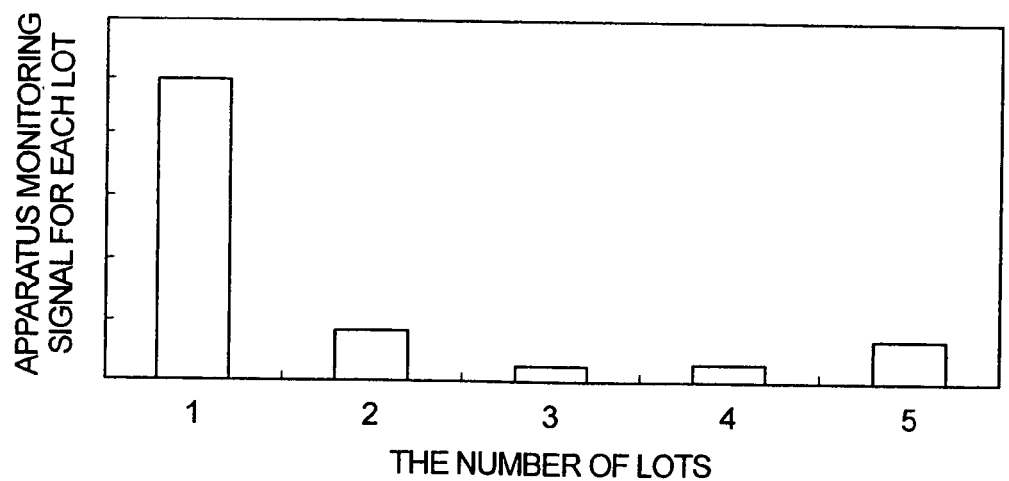
FIG. 19 is a diagram showing an example of data of comparison conducted from lot to lot in the embodiment of FIG. 16.

An example of a graph representing a comparison of these two signals is shown in FIG. 18. The processing state comparing decision section 19 calculates a deviation of the apparatus monitoring signal 53 from the apparatus monitoring signal 52 in each lot, and generates comparison data of respective lots as shown in FIG. 19. The processing state comparing decision section 19 generates data and displays the data on a display section 7. When an apparatus monitoring signal is average data or the like in a selected sample processing division, the comparison data of the above described two signals can be obtained simply by deriving the difference between them. Furthermore, when the apparatus monitoring signal holds temporal variation information in a selected sample processing division, an area of a deviation between graphs of temporal variation patterns of two signals can also be made comparison data. Furthermore, as for the standard data, the semiconductor manufacturing apparatus maker may set the standard data in a database previously, or monitor data obtained when a processing result was normal in past sample processing may be adopted. In addition, it is also possible to provide a threshold for the comparison result, and judge conducted processing to be abnormal and issue a warning, when comparison data has exceeded the threshold.

Furthermore, by using the above described database of the variation pattern of the standard apparatus monitoring signal, it is also possible to detect a division among the sample processing divisions in that the processing is abnormal. Every some sample processing divisions, the sample processing divisions are arranged in decreasing order of deviation of a change of the apparatus monitoring signal from the standard. By displaying this ranking, it is possible to indicate in which sample processing division during processing of one sample an abnormality has occurred.

Figure 20:
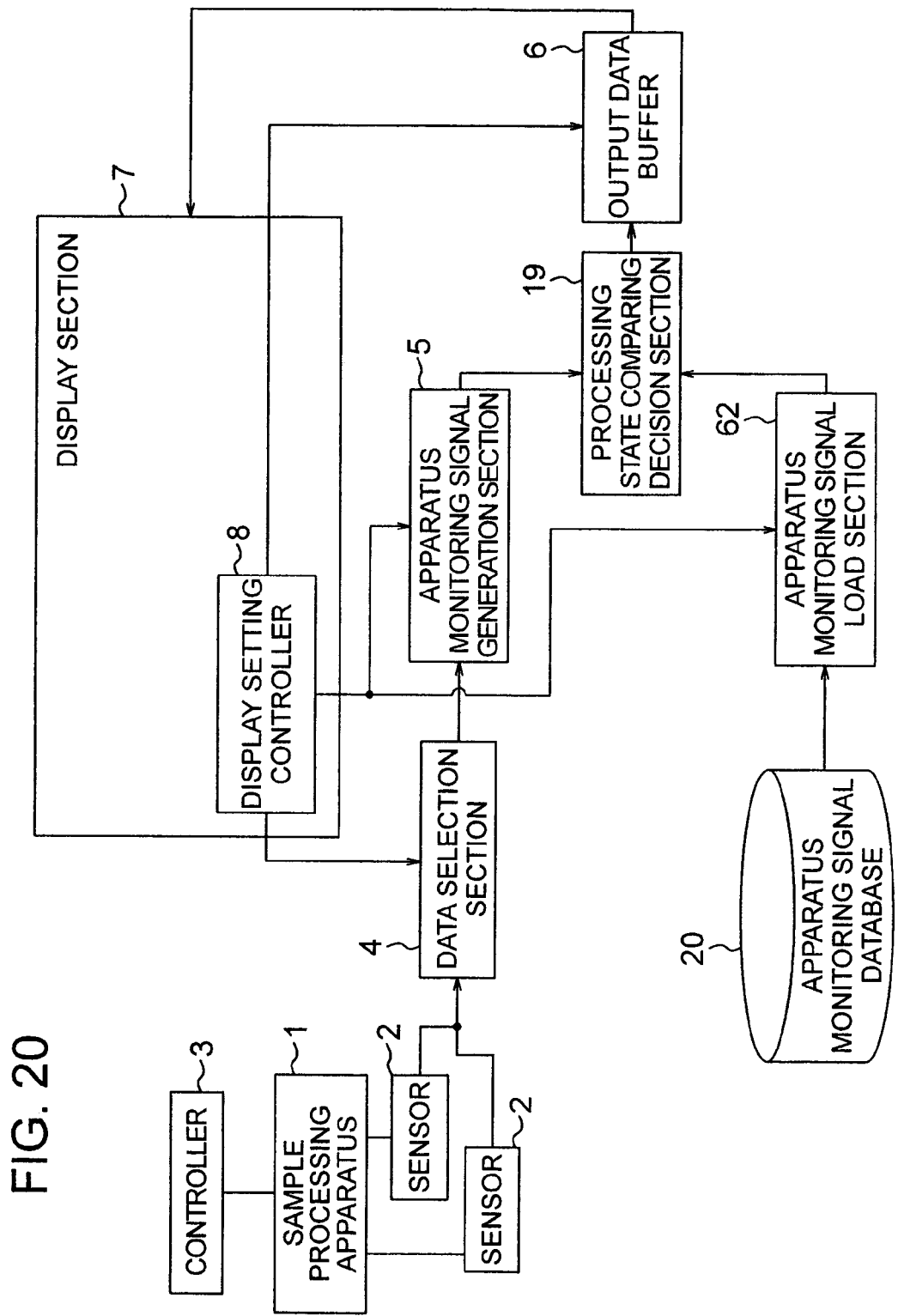
FIG. 20 is a diagram showing another embodiment of a sample processing apparatus of the present invention.

FIG. 20 shows another embodiment of the sample processing apparatus 1 according to the present invention. Operation of the sample processing apparatus 1 is nearly the same as that of the embodiment of FIG. 17 except in that past apparatus monitoring signals are preserved in an apparatus monitoring signal database 20 instead of preserving the monitor data of past sample processing. As a result, the capacity of the database can be reduced. For this purpose, past apparatus monitoring signals preserved in the apparatus monitoring signal database 20 are loaded by an apparatus monitoring signal load section 62 under the control of a controller 8, given to a processing state comparing decision section 19, and compared with apparatus monitoring signals supplied from an apparatus monitoring generation section 5.

Figure 21:
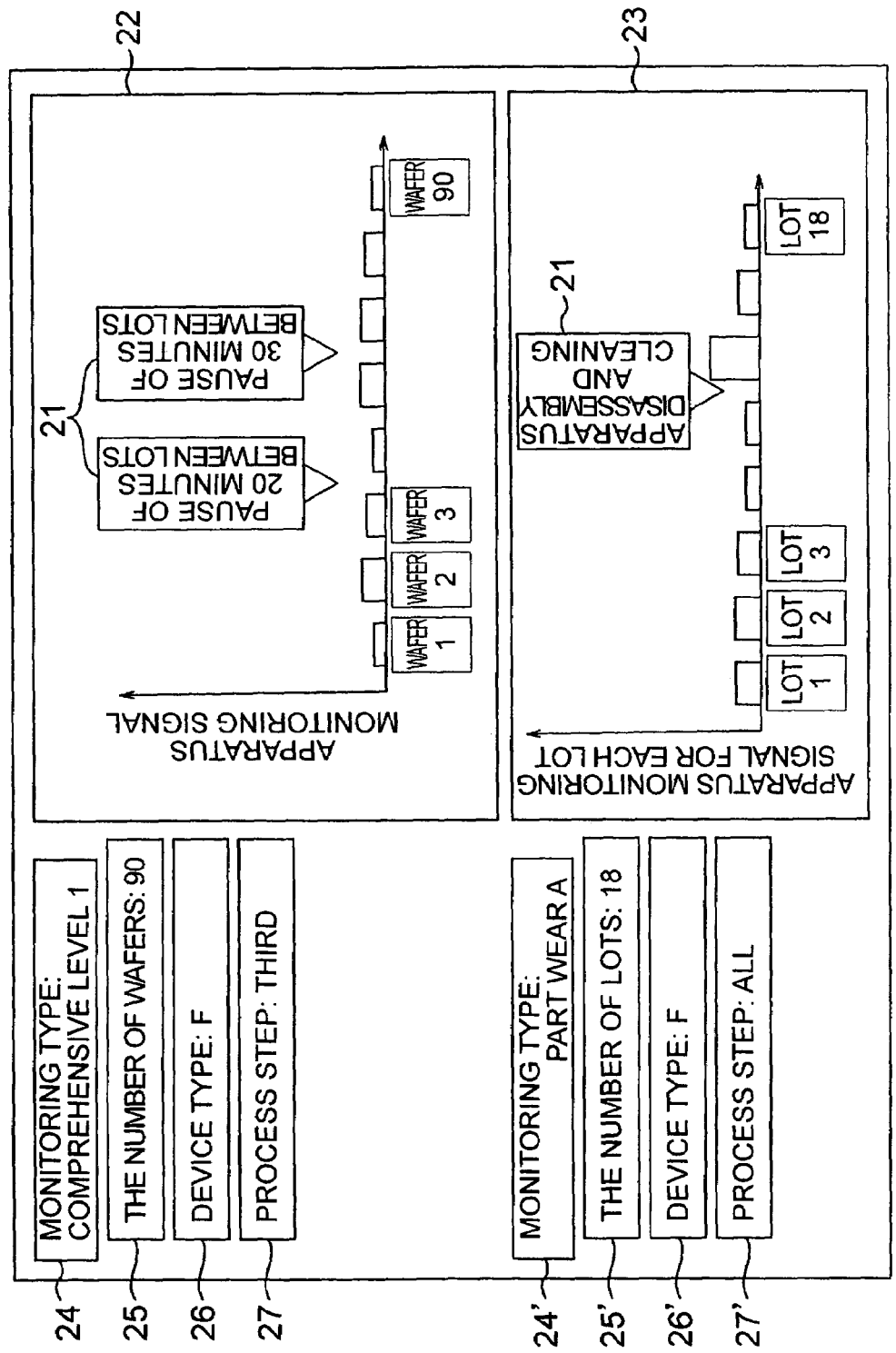
FIG. 21 is a diagram showing another embodiment of a display screen of a display section in a sample processing apparatus of the present invention.

In FIG. 21, another embodiment of the display screen of the display section 7 in the sample processing apparatus 1 of the present invention is shown. The window 22 displays a variation of the processing state from wafer to wafer. The window 22 displays a graph with, for example, the abscissa indicating wafers finished in processing and arranged in a time series and the ordinate indicating the apparatus monitoring signal plotted for each wafer. A description 21 of an event that has occurred in the apparatus may be added to the window 22. As for this event, not only an event that has occurred in the processing apparatus currently under processing, but also an event that occurred in a semiconductor manufacturing apparatus that processed displayed wafers in the past may be acquired by a LAN or the like and displayed. A button 24 displays a monitoring type of the apparatus monitoring signals currently displayed in the window 22. In addition, the button 24 may serve as a command button for opening a monitoring type setting window. In the same way, a button 25 displays the number of wafers displayed in the window 22. In addition, the button 25 is also a command button for opening a display sample number setting window. A button 26 displays a device type, i.e., a sample kind displayed in the window 22. In addition, the button 26 is also a command button for opening a device type setting window. A button 27 displays a sample processing division for generating the apparatus monitoring signals to be displayed in the window 22. In addition, the button 27 is also a command button that opens a window for selecting the sample processing division.

In the embodiment of FIG. 21, a window 23 displays a variation of the processing state from lot to lot. The window 23 displays a graph with, for example, the abscissa indicating lots finished in processing and arranged in a time series and the ordinate indicating the apparatus monitoring signal plotted for each lot. In manufacturing semiconductor devices, samples are processed by taking a cluster of several samples called lot as the unit.

In the case of 8-inch wafers, a cluster of twenty-five wafers is one lot in many cases. However, the number of samples included in one lot differs according to circumstances. Cleaning of the internal wall of the apparatus is conducted between samples in some cases. However, special cleaning processing is conducted between lots in some cases. Furthermore, in an idle time between lots, the temperature of each place in the processing chamber might change. Even in such a situation that samples are processed stably, therefore, the apparatus monitoring signals obtained by monitoring the sample processing do not become a constant value. A constant pattern often repeats from lot to lot. In such a case, the conventional monitoring method of only determining whether the apparatus monitoring signals exists in a certain constant range is insufficient.

In the present embodiment, an apparatus monitoring signal is compared with a variation pattern of a standard apparatus monitoring signal obtained during processing of a pertinent device and acquired from the database. The comparison data is displayed as an apparatus monitoring signal plotted from lot to lot. A lot that has had an abnormality in processing can be easily found. Furthermore, it is more desirable that if a display portion of a lot is selected by a mouse or the like apparatus monitoring signals of respective materials in that lot are displayed. In this case, when a lot that is considered to be abnormal is found, selecting a display portion of this lot causes processing states of samples belonging to the abnormal lot to be displayed in the window 22. A sample included in the abnormal lot and subjected to abnormal processing can be easily found. Display in the window 23 can also be controlled by using buttons 24', 25', 26' and 27' having functions similar to those of the window 22.

Furthermore, by using the above described database of the variation pattern of the standard apparatus monitoring signal, it is also possible to detect a division among the sample processing divisions in that the processing is abnormal. Every some sample processing divisions, the sample processing divisions are arranged in decreasing order of deviation of a change of the apparatus monitoring signal from the standard. By displaying this ranking, it is possible to indicate in which sample processing division during processing of one sample an abnormality has occurred.

Figure 22:
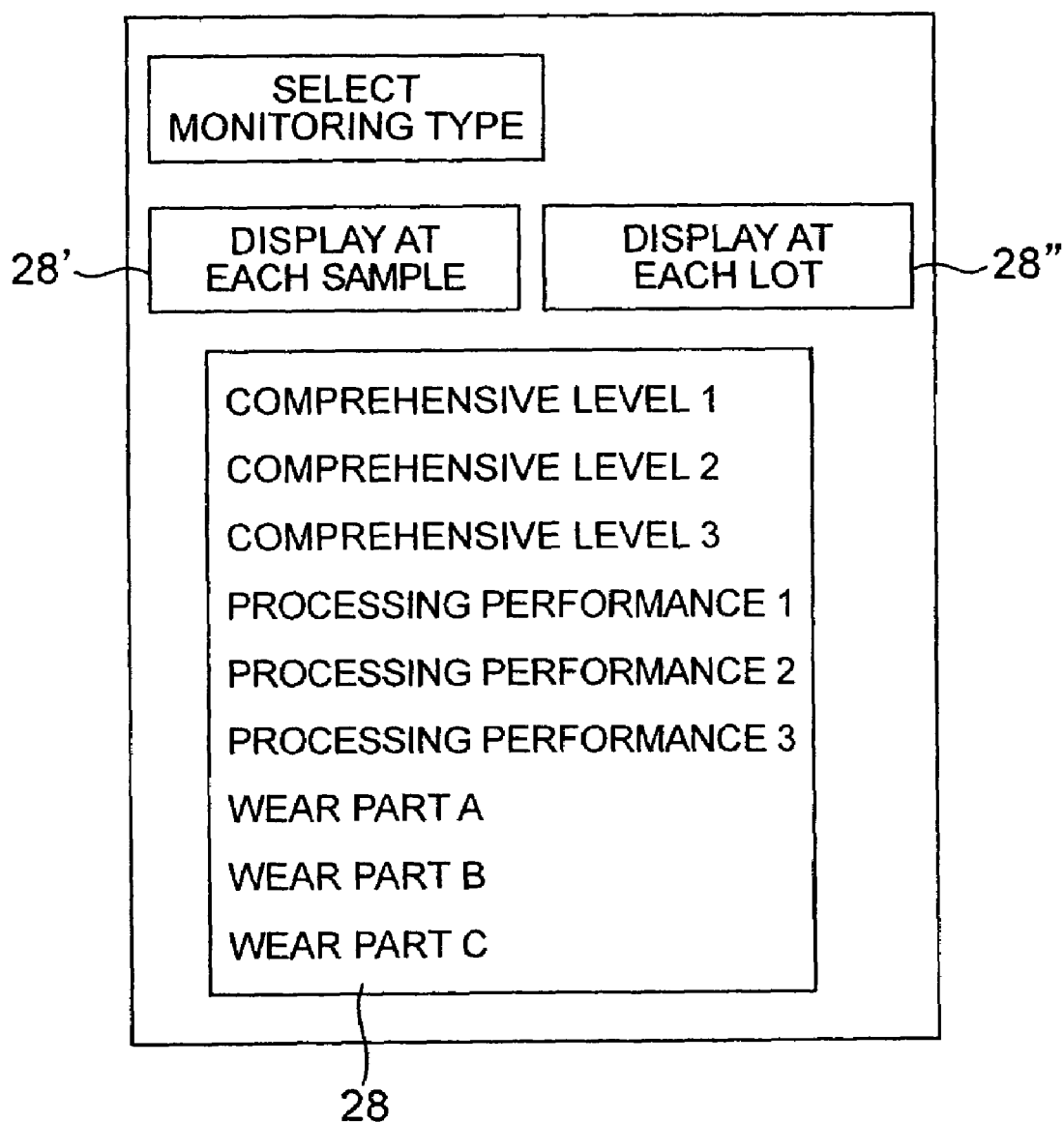
FIG. 22 is a diagram showing another example of a display screen of a display section in a sample processing apparatus of the present invention.

In FIG. 22, another embodiment of the display screen of the display section 7 in the sample processing apparatus 1 of the present invention is shown. FIG. 22 shows an example of a monitoring type selection window. A monitoring type can be selected by using a menu 28. As for selection items of the menu 28, for example, "comprehensive level 1" is a monitoring type for displaying a rough processing state of the apparatus. "Comprehensive level 2" is a monitoring type of the processing state for monitoring a finer variation of the processing state. "Comprehensive level 3" is a monitoring type for monitoring a further finer variation. Besides, there may be an item of "processing performance" relating to the working dimension precision and working speed. There may be an item of "part wear" for indicating the degree of wear of parts in the apparatus. The check box 28 may be formed so that a multiplicity of kinds may be selected. In the case where a multiplicity of kinds have been selected, apparatus monitoring signals of a multiplicity of kinds are displayed in the window 22 and the window 23. Furthermore, a sample after sample display selection button 28' and a lot after lot display selection button 28" may also be provided.

Figure 23:
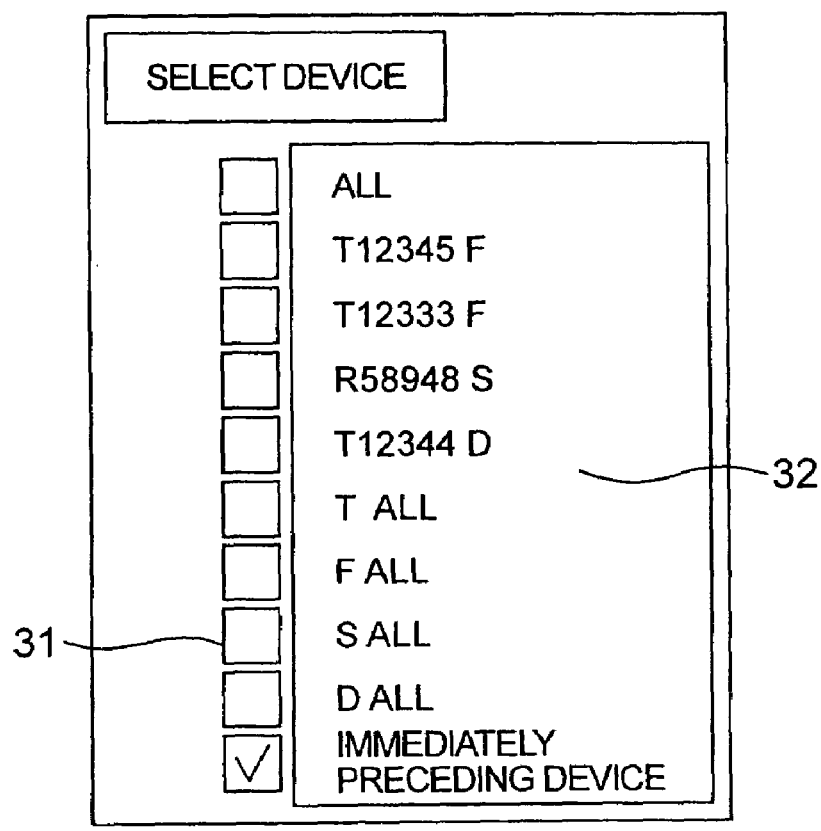
FIG. 23 is a diagram showing another embodiment of a display section in a sample processing apparatus of the present invention.

In FIG. 23, another embodiment of the display section 7 in the sample processing apparatus 1 of the present invention is shown. FIG. 23 shows an example of a display sample number setting window. In the case of display conducted from sample to sample as in the window 22, the number of display samples 29 can be selected. In the case of display conducted from lot to lot as in the window 23, the number of display lots 30 can be selected.

Figure 24:
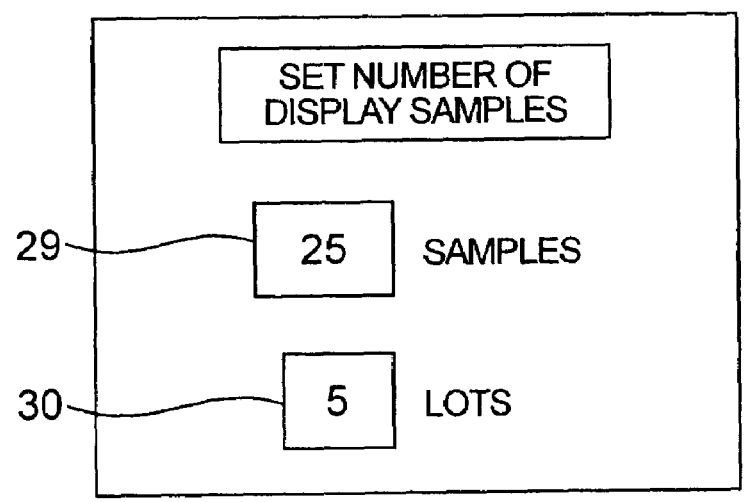
FIG. 24 is a diagram showing another embodiment of a display section in a sample processing apparatus of the present invention.

In FIG. 24, another example of the display section 7 in the sample processing apparatus 1 of the present invention is shown. FIG. 24 shows an example of a device selection window. A multiplicity of device kinds of displayed samples can be selected by using check boxes 31. On device labels 32 corresponding to the check boxes 31, device kinds are listed. For example, it is now assumed that a device name is "T12345F" and "T" and "F" in the device name have meanings concerning the device structure. In this case, it is desirable to be able to select not only "T12345F" as the display device name but also all device names beginning with "T" or all device names ending with "F". On the device labels 32, it is also made possible to select all of the same devices as the sample finished in processing immediately before. When there are a multiplicity of kinds of recipes, i.e., combinations of processing conditions for the same device, it is also permissible to recognize them as respectively separate devices and allow device selection. Or a separate recipe selection window may also be prepared.

Figure 25:
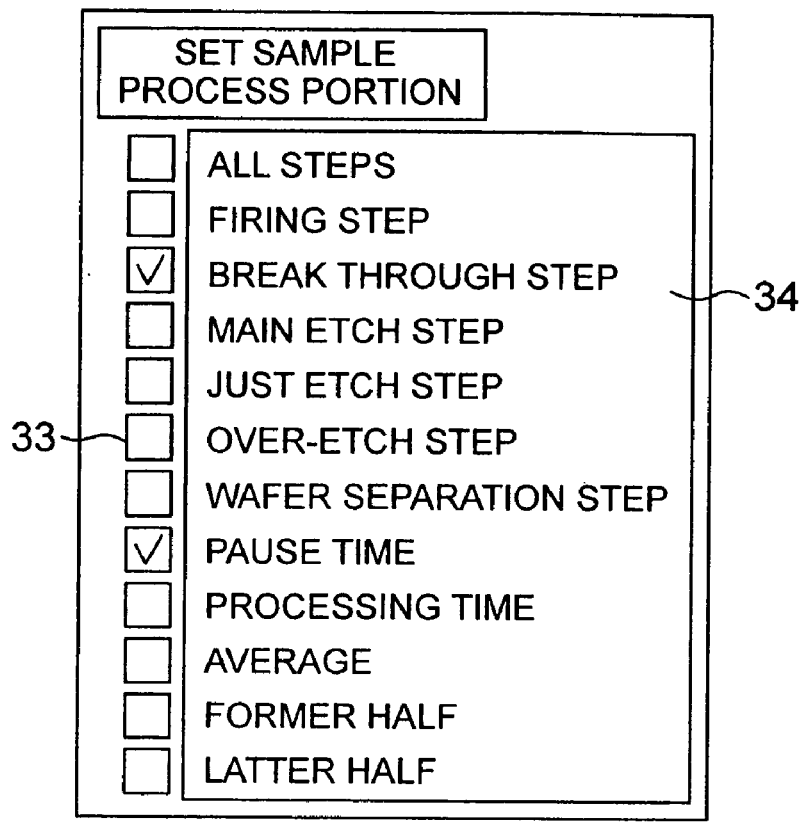
FIG. 25 is a diagram showing another embodiment of a display section in a sample processing apparatus of the present invention.

In FIG. 25, another embodiment of the display section 7 in the sample processing apparatus 1 of the present invention is shown. FIG. 25 shows an example of a sample processing division selection window. By using check boxes 33, a multiplicity of sample processing divisions to be used for generating the apparatus monitoring signals can be selected. From a multiplicity of sample processing divisions, one apparatus monitoring signal may be generated and displayed. Or a multiplicity of apparatus monitoring signals may be generated and displayed. On sample processing division labels 34 corresponding to the check boxes 33, sample processing division names are displayed. Since the sample processing division name required to generate the apparatus monitoring signal differs depending upon the monitoring type, it is desirable that the sample processing division labels 34 differ according to the monitoring type selected by using the pull-down menu 28.

Figure 26:
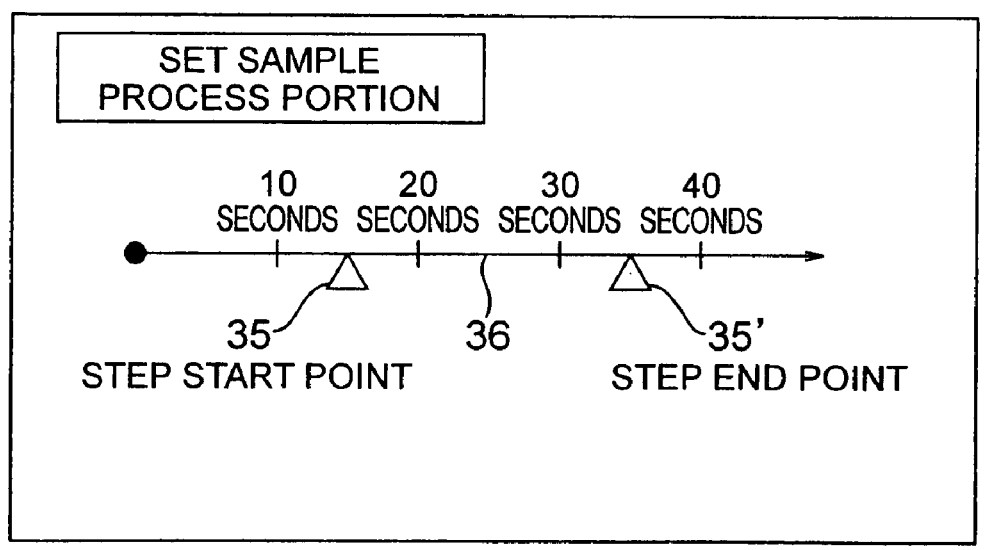
FIG. 26 is a diagram showing another embodiment of a display section in a sample processing apparatus of the present invention.

In FIG. 26, another embodiment of the display section 7 in the sample processing apparatus 1 of the present invention is shown. FIG. 26 shows another example of the sample processing division selection window. By specifying a step start point 35 and a step end point 35' on a time axis 36, an arbitrary time range can be extracted as a sample processing division.

Figure 27:
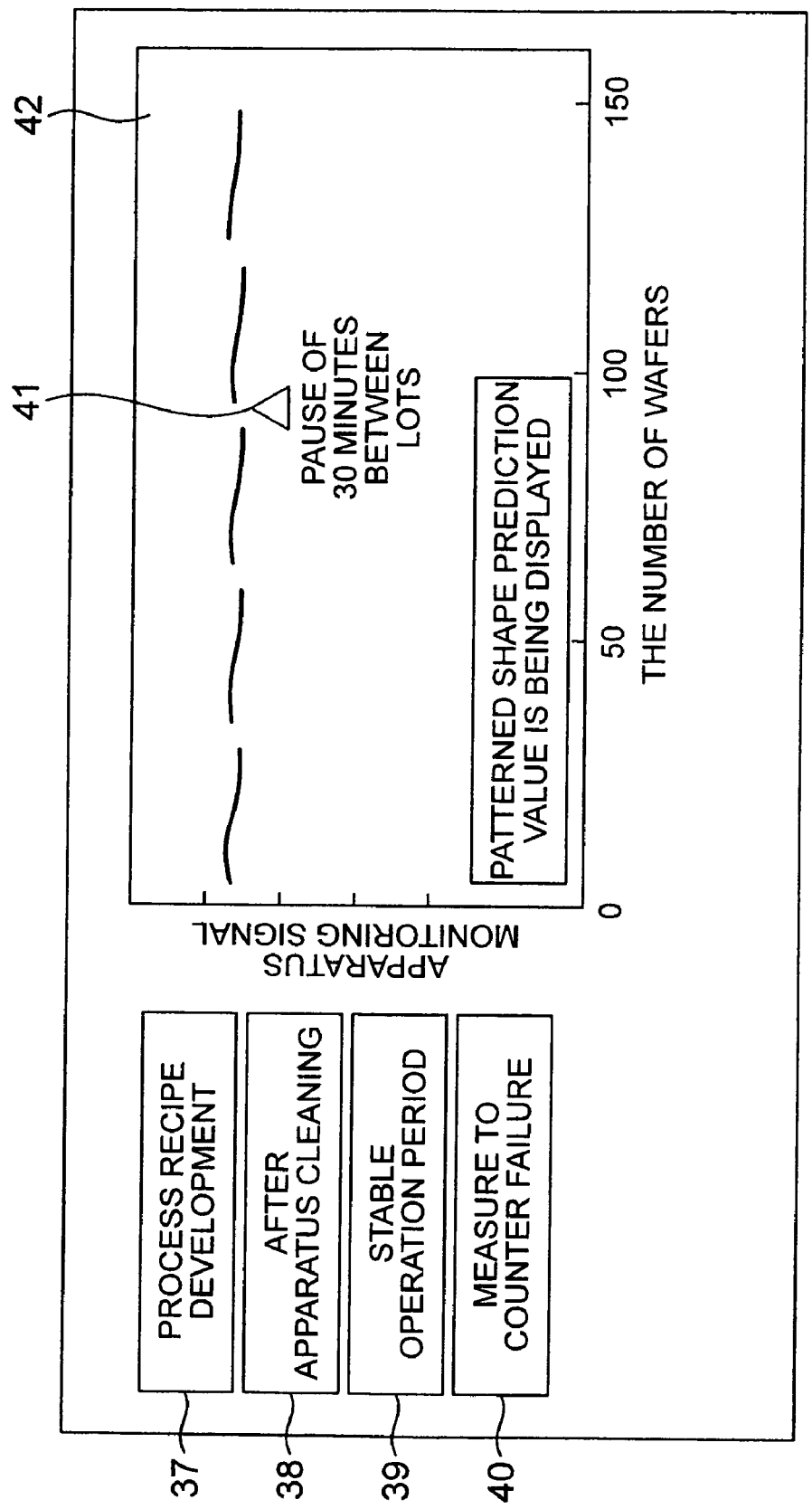
FIG. 27 is a diagram showing another embodiment of a display section in a sample processing apparatus of the present invention.

In FIG. 27, another embodiment of the display section 7 in the sample processing apparatus 1 of the present invention is shown. FIG. 27 shows a system for automatically selecting an apparatus monitoring signal to be displayed and a display method according to a use situation of the apparatus. For example, if a "process recipe development" button 37 is pressed, then an apparatus monitoring signal, such as a patterned shape predicted value, required when developing a process recipe is automatically selected and displayed. Furthermore, if an "after apparatus cleaning" button 38 is pressed, then an apparatus monitoring signal, such as an apparatus monitoring signal indicating residual gas, required after the apparatus cleaning is automatically displayed. Furthermore, if a "stable operation phase" button 39 is pressed, then a multiplicity of apparatus monitoring signals that indicate the degree of wear of parts and patterned shape to be monitored during the stable operation phase of the apparatus are displayed. Furthermore, if a "measure to counter failure" button 40 is pressed, then an apparatus monitoring signal that reflects part engagement or the like of the apparatus is generated by an impedance monitor section or the like and displayed. Furthermore, a suitable event description portion 41 is displayed in a window 42 for each button.

Figure 28:
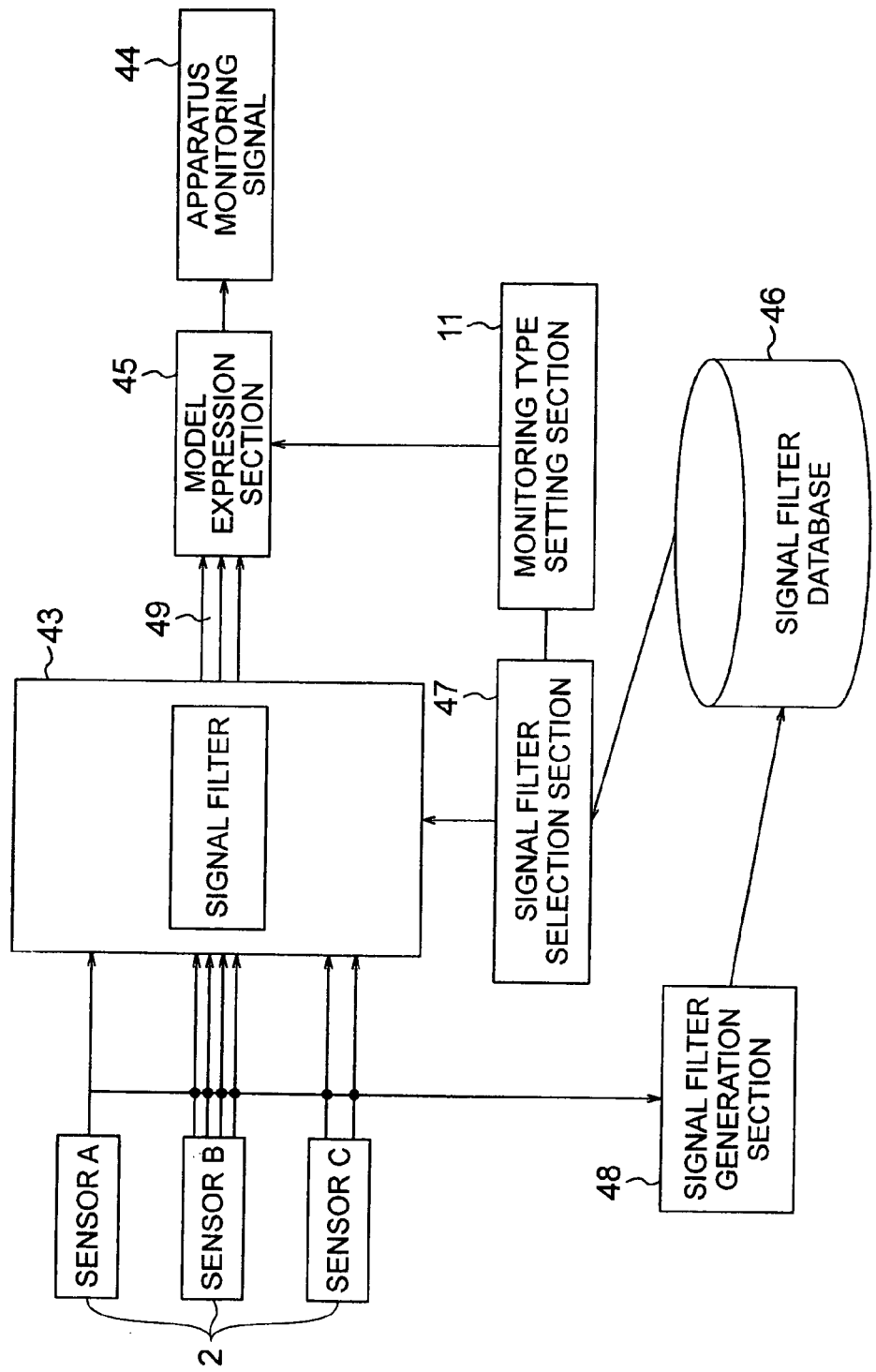
FIG. 28 is a diagram showing another embodiment of a display section in a sample processing apparatus of the present invention.

In FIG. 28, another embodiment of the display section 7 in the sample processing apparatus 1 of the present invention is shown. In the embodiments heretofore described, such as semiconductor manufacturing apparatuses using plasma, it is desirable to use as many sensors in quantity and kind as possible in order to accurately grasp the processing state of the apparatus. If the apparatus is monitored by using a large number of sensors, then a large amount of monitor data are generated momentarily, and it is difficult to generate an apparatus monitoring signal therefrom.

In this embodiment, therefore, there is effective a technique of converting a wide variety of monitor data acquired from the sensors 2 to a small number of effective signals 49 by using a signal filter 43, supplying the effective signals to a model expression section 45, and thereby obtaining an apparatus monitoring signal 44. It is usual that a large number of model expressions have been prepared in the model expression section 45. According to a monitoring type set by a monitoring type setting section 11, a corresponding model expression is selected. By substituting the effective signals 49 into a selected model expression, the apparatus monitoring signal 44 is obtained. A signal filter 43 for generating the effective signals to be substituted into the model expression may differ according to the monitoring type. The signal filter 43 is acquired from a signal filter database 46 by a signal filter selection section 47 and used. Signal filters stored in the signal filter database 46 may be preserved previously. Or eigenvectors obtained by analyzing the monitor data obtained when processing has been completed normally, by use of a principal ingredient analysis may be preserved in the signal filter database as a signal filter. The principal ingredient analysis is a typical statistical analysis method capable of taking out an effective signal from a large number of signals in a descending order of importance.

In order to obtain the effective signals to be used in the model expression 45 for generating a certain apparatus state signal, it is also possible to process a special processing setting combination, conduct a principal ingredient analysis, and regenerate a signal filter that is optimum for the apparatus state at that time. The model expression 45 can also be obtained by conducting linear modeling, such as the multiple regression analysis, between the apparatus performance to be monitored, such as a value a deviation value of the patterned shape, and the effective signals 49. Or the model expression 45 can also be obtained by forecasting a function form of the model expression 45 from a physical model of the processing and fitting the coefficients thereof. By using the system of FIG. 28, a predicted value of a physical quantity, such as the patterned shape of the sample, to be measured after the sample processing can be displayed immediately after the sample processing without measuring it. Early abnormality detection can be conducted.

Figure 29:
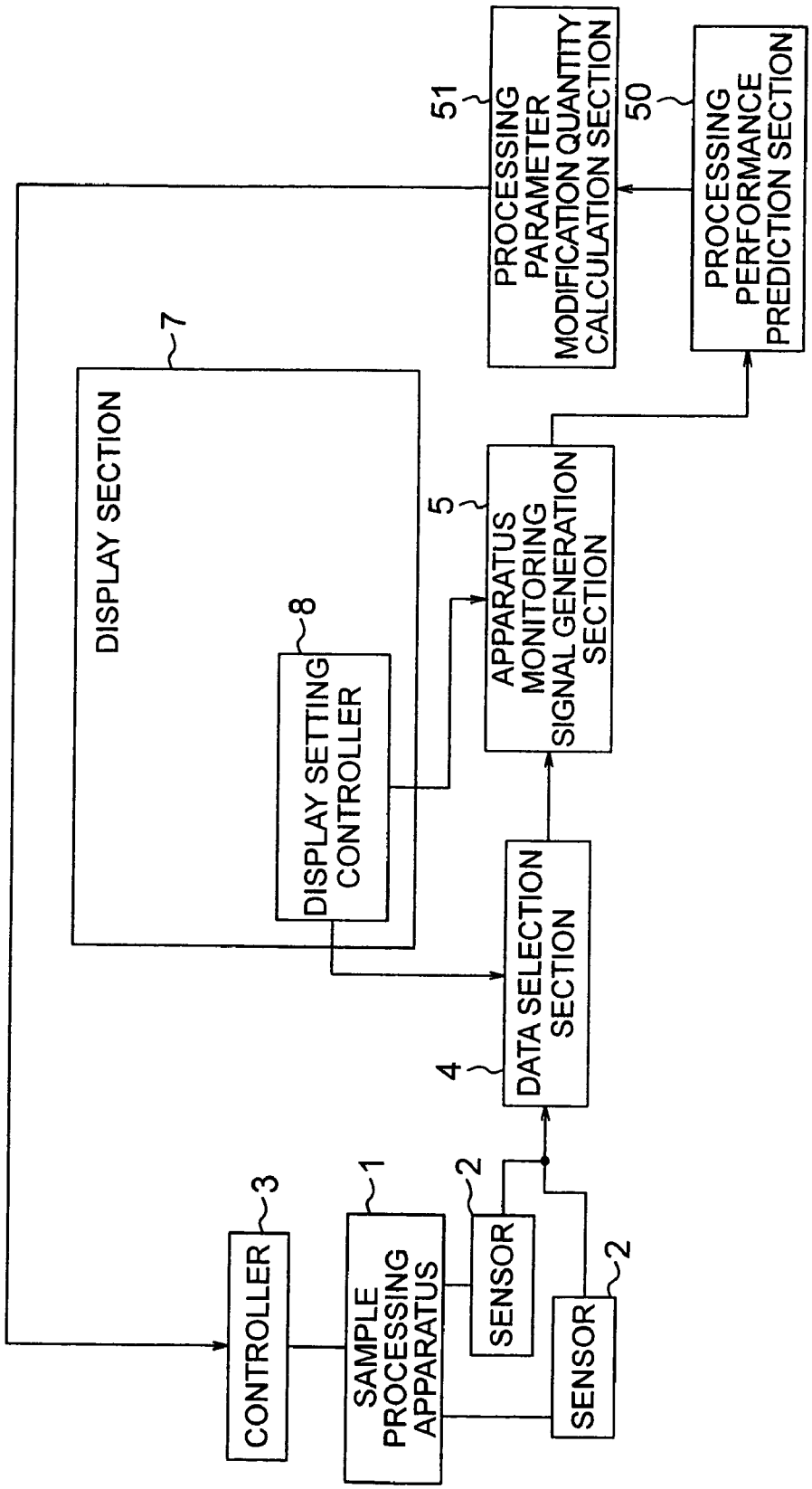
FIG. 29 is a diagram showing another embodiment of a display section in a sample processing apparatus of the present invention.

In FIG. 29, another embodiment of the display section 7 in the sample processing apparatus 1 is shown. The monitoring and display method heretofore described can be used for the apparatus control as well. This embodiment is a system for delivering apparatus monitoring signals obtained by an apparatus monitoring signal generation section 5 to a processing performance prediction section 50, delivering a processing performance predicted by the processing performance prediction section 50 to a processing parameter modification quantity calculation section 51, calculating a correction quantity of a processing parameter for removing a deviation of a predicted value of the processing performance from a standard value, delivering the correction quantity to a controller 3 of the semiconductor manufacturing apparatus, and controlling the processing condition of the next sample.

As already described, sample processing in the semiconductor manufacturing apparatus is repeated by taking a lot as the unit. It is also possible to store the correction quantity and correct the processing condition of a sample in the same position of the next lot. When the kind of the device of the next lot is different, a correction quantity conversion table between devices becomes necessary in some cases.

Another embodiment of the display section 7 in the sample processing apparatus 1 of the present invention will now be described. For example, a principal ingredient of an emission spectrum obtained by analyzing the principal ingredient of the emission spectrum during the wafer processing can be used as a monitoring signal. At this time, some principal ingredients have correlation to quantities of respectively different reactive activated species. For monitoring process results such as patterned shapes, therefore, it is necessary to monitor relations among some principal ingredients. In the present embodiment, therefore, values of monitoring signals that indicate intensities of the principal ingredients of different emission spectra on the abscissa and ordinate are displayed on the display screen of the display section 7 in a time series manner as a two-dimensional graph by the display setting controller 8, for example, in the configuration of FIG. 1. By thus displaying values of the monitoring signals for the principal ingredients of different emission spectra as a two-dimensional graph in a time series manner, the process reproducibility can be confirmed from the locus of different monitoring signals.

Figure 30:
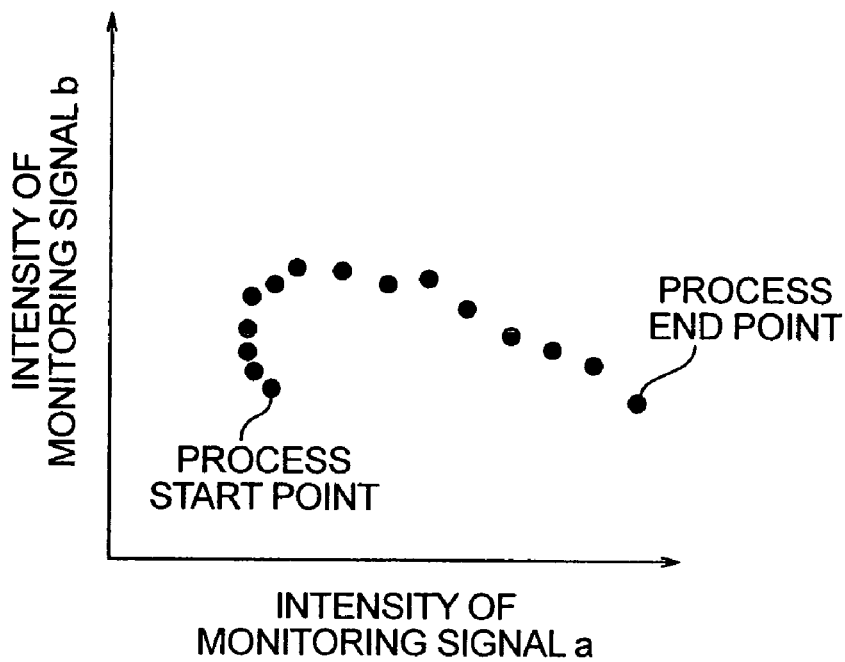
FIGS. 30, 31, 32 and 33 are diagrams showing display screen examples in other embodiments of a display section in a sample processing apparatus of the present invention.
Figure 31:
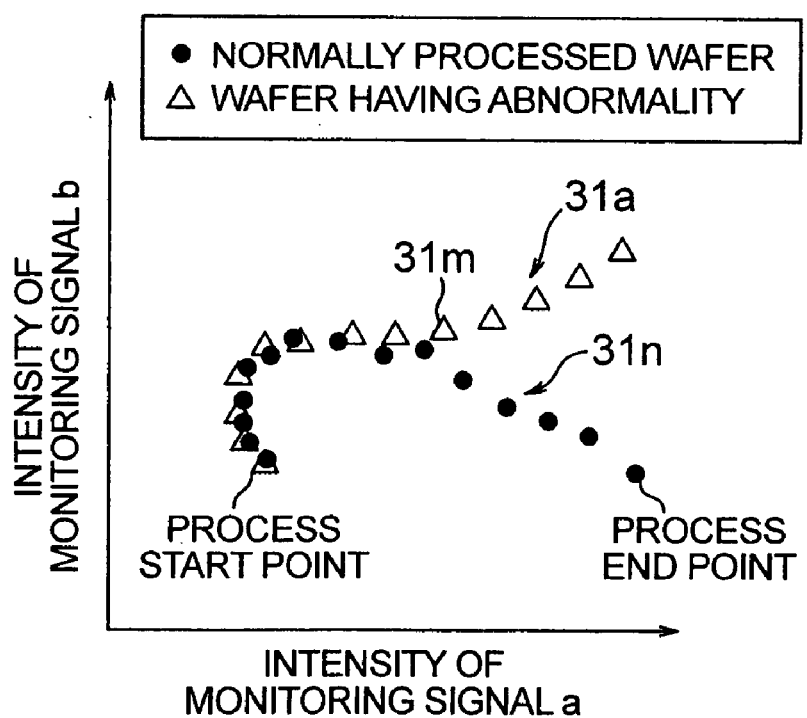

For example, as shown in FIG. 30, a change of the value of a monitoring signal "a" that indicates the intensity of a first principal ingredient and the value of a monitoring signal "b" that indicates the intensity of a second principal ingredient during processing of one wafer is plotted at intervals of, for example, one second. The example of FIG. 30 shows the case where processing of one wafer has been conducted normally. In other words, at the time of normal wafer processing, the locus of the monitoring signals "a" and "b" lies nearly upon a locus indicated by ● every wafer processing. On the other hand, in an example of FIG. 31, a locus 31a of the monitoring signals "a" and "b" indicated by Δ deviates from a normal locus 31n of the monitoring signals "a" and "b" indicated by ●. Therefore, the wafer processing indicated by the locus 31a can be judged to be abnormal. In this case, the time when an abnormality has occurred in processing can be identified on the basis of a point 31m at which the locus 31a of the monitoring signals "a" and "b" indicated by Δ begins to deviate from the normal locus 31n of the monitoring signals "a" and "b" indicated by ●.

Figure 32:
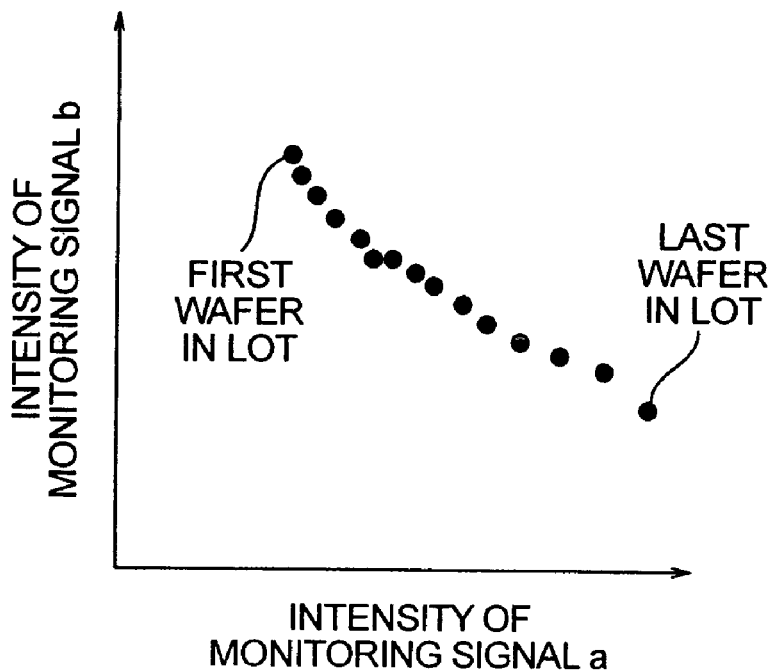
Figure 33:
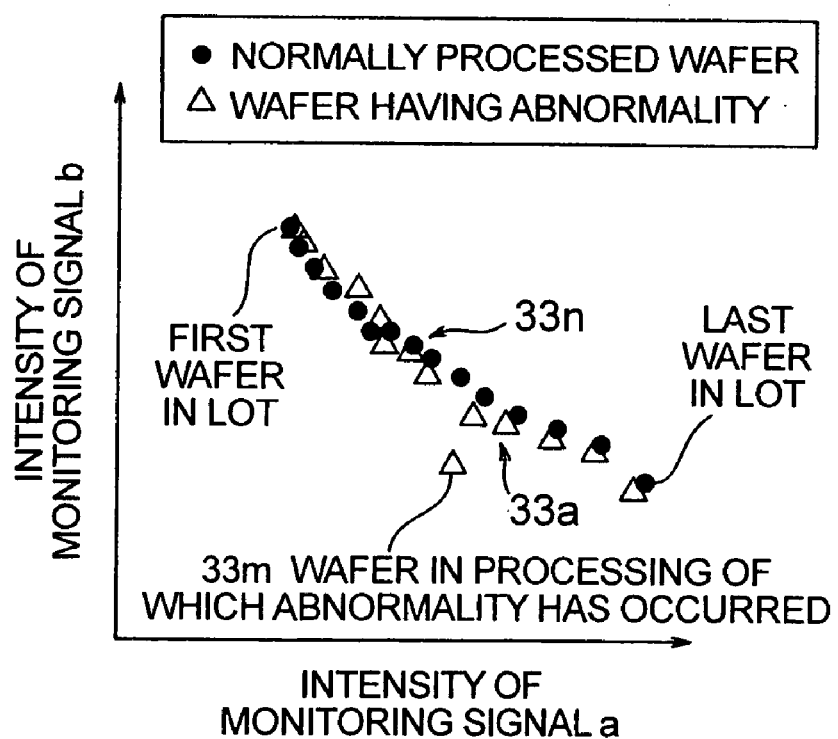

An example of FIG. 32 shows the case where processing of a multiplicity of wafers in one lot have been conducted normally. In other words, in the case where all processing of a multiplicity of wafers in one lot is normal, the locus of the monitoring signals "a" and "b" lies nearly upon a locus indicated by ● every lot. On the other hand, in an example of FIG. 33, a locus 33a of the monitoring signals "a" and "b" indicated by Δ deviates at a point 33m from a normal locus 33n of the monitoring signals "a" and "b" indicated by ●. Therefore, the processing of a multiplicity of wafers in one lot indicated by the locus 33a can be judged to be abnormal in the processing of the wafer 33m. A wafer in processing of which an abnormality has occurred can be thus identified.

The display section of each of the embodiments heretofore described may be attached to the processing apparatus or may be mounted so as to display the information on a terminal installed in an office or a remote monitoring company via a network. Especially, since apparatus monitoring data is much smaller in size than monitor data in many cases, the load on the network is light and apparatus monitoring data is optimum for use in remote diagnosis or the like.

Furthermore, these embodiments have been described mainly as to semiconductor devices. However, a similar monitoring function can also be applied to manufacturing apparatuses and manufacturing methods of other samples such as LCD devices.

According to the present invention, there is provided a section for monitoring the processing state of a sample processing apparatus having a various complicated states due to processing conditions and the accumulated number of processed samples, and acquiring apparatus monitoring signals used to monitor the apparatus, from the various processing sequences. As a result, it is possible to provide a process monitoring device and its display method, a control method of a sample processing apparatus, and a semiconductor device manufacturing method that can be easily operated.

Furthermore, according to the present invention, monitor data are acquired from the plasma device by using sensors, and apparatus monitoring signals are generated from data of the most important sample processing division concerning the sample processing performance. As a result, it is possible to monitor the change of the processing state accurately and easily, and control the processing conditions.

What is claimed is:

1. A plasma processing apparatus for processing a sample within a vacuum vessel, comprising:
 a plurality of sensors for detecting plural kinds of information relating to a processing state of the sample as monitor data;
 data selecting means for selecting a detection time range of the monitor data thus detected which is used for monitoring the plasma processing apparatus;
 a signal filter for converting the monitor data within the selected detection time range into an effective signal;

a model expression unit for generating a predicted value of a patterned physical-shape of a sample based on the effective signal; and a display screen for displaying the patterned physical-shape predicted value;

wherein the display screen displays the patterned physical-shape predicted value without measuring a patterned shape after processing of the sample.

2. A plasma processing apparatus for processing a sample within a vacuum vessel, comprising:

a plurality of sensors for detecting plural kinds of information relating to a processing state of the sample as monitor data;

data selecting means for selecting a detection time range of the monitor data thus detected which is used for monitoring the plasma processing apparatus;

a signal filter for converting the monitor data within the selected detection time range into an effective signal;

a processing performance prediction section for predicting a patterned physical-shape of a sample based on the apparatus monitoring signal; and a processing parameter modification quantity calculation section for calculating a correction quantity of a processing parameter for removing a deviation of a predicted value of the patterned physical-shape of the sample predicted by the processing performance prediction section from a standard value so as to control the processing parameter.

* * * * *